(12) United States Patent
Ueda et al.

(10) Patent No.: US 10,882,992 B2
(45) Date of Patent: Jan. 5, 2021

(54) THERMOPLASTIC RESIN COMPOSITION AND MOLDED ARTICLE THEREOF

(71) Applicant: Toray Industries, Inc., Tokyo (JP)

(72) Inventors: Takashi Ueda, Ichihara (JP); Masanori Kobayashi, Ichihara (JP); Daisuke Sato, Ichihara (JP); Taro Yamashita, Ichihara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/339,849

(22) PCT Filed: Oct. 17, 2017

(86) PCT No.: PCT/JP2017/037546
§ 371 (c)(1),
(2) Date: Apr. 5, 2019

(87) PCT Pub. No.: WO2018/083975
PCT Pub. Date: May 11, 2018

(65) Prior Publication Data
US 2020/0048457 A1 Feb. 13, 2020

(30) Foreign Application Priority Data

Nov. 2, 2016 (JP) .................................. 2016-214907
Nov. 2, 2016 (JP) .................................. 2016-214908

(51) Int. Cl.
| | | |
|---|---|---|
| C08L 69/00 | (2006.01) | |
| C08L 33/08 | (2006.01) | |
| C08L 33/12 | (2006.01) | |
| C08L 33/24 | (2006.01) | |
| C08L 55/02 | (2006.01) | |
| C08K 3/013 | (2018.01) | |
| C08K 3/34 | (2006.01) | |

(52) U.S. Cl.
CPC ............... *C08L 69/00* (2013.01); *C08L 33/08* (2013.01); *C08L 33/12* (2013.01); *C08L 33/24* (2013.01); *C08L 55/02* (2013.01); *C08K 3/013* (2018.01); *C08K 3/34* (2013.01)

(58) Field of Classification Search
CPC ...................................................... C08L 25/12
See application file for complete search history.

(56) References Cited

U.S. PATENT DOCUMENTS

2005/0159546 A1* 7/2005 Weber .................... C08L 55/02
525/67

FOREIGN PATENT DOCUMENTS

| JP | 2000080263 A | 3/2000 |
|---|---|---|
| JP | 2002275367 A | 9/2002 |
| JP | 2003206398 A | 7/2003 |
| JP | 2011219553 A | 11/2011 |
| JP | 2015131876 A | 7/2015 |
| JP | 2015145479 A | 8/2015 |

OTHER PUBLICATIONS

International Search Report and Written Opinion for International Application No. PCT/JP2017/037546 dated Jan. 5, 2018, 5 pages.

* cited by examiner

*Primary Examiner* — Ana L. Woodward
(74) *Attorney, Agent, or Firm* — Ratnerprestia

(57) ABSTRACT

A thermoplastic resin composition exhibiting good balance of mechanical properties, heat resistance, flowability, and size stability as well as excellent stability in retention in the molding, appearance of the molded article, and coating properties, and also, a molded article thereof are provided. The thermoplastic resin composition is a blend of a polycarbonate resin (I), a graft copolymer (II) which comprises a graft copolymer (II-1) prepared by graft polymerization of a monomer mixture containing an aromatic vinyl monomer and a vinyl cyanide monomer in the presence of a diene rubbery polymer or a graft copolymer (II-2) prepared by graft polymerization of a monomer mixture containing an aromatic vinyl monomer and a vinyl cyanide monomer in the presence of an acryl rubbery polymer, a vinyl copolymer (III) prepared by copolymerizing an aromatic vinyl monomer and a vinyl cyanide monomer, a crystalline resin (IV), and a plate-shaped inorganic filler (V), and when total amount of (I)+(II)+(III)+(IV)+(V) is 100% by weight, (I) is 50 to 70% by weight, (II) is 3 to 15% by weight, (III) is 10 to 25% by weight, (IV) is 1 to 9% by weight, and (V) is 10 to 20% by weight, and content ratio of (IV) to 100% by weight of (V) is at least 10% by weight and less than 50% by weight.

7 Claims, 1 Drawing Sheet

THERMOPLASTIC RESIN COMPOSITION AND MOLDED ARTICLE THEREOF

CROSS REFERENCE TO RELATED APPLICATIONS

This is the U.S. National Phase application of PCT/JP2017/037546, filed Oct. 17, 2017 which claims priority to Japanese Patent Application No. 2016-214908, filed Nov. 2, 2016 and Japanese Patent Application No. 2016-214907, filed Nov. 2, 2016, the disclosures of each of these applications being incorporated herein by reference in their entireties for all purposes.

FIELD OF THE INVENTION

The present invention relates to a thermoplastic resin composition exhibiting good balance of mechanical properties, heat resistance, flowability, and size stability as well as excellent stability in retention in the molding, appearance of the molded article, and coating properties. The present invention also relates a molded article thereof.

BACKGROUND OF THE INVENTION

Polycarbonate resins are widely used in a wide variety of fields such as automobiles, home appliance, OA appliance, and building materials since they have excellent heat resistance and impact resistance. In the meanwhile, rubber-modified styrene resins as typically represented by ABS resin are also widely used in the fields including automobiles, home appliance, and OA appliance as a material for molding various constitutional members since they have excellent workability and mechanical properties. Since polycarbonate resins are inferior in molding workability in the injection molding and secondary workability compared to the rubber-modified styrene resin, the polycarbonate resin and the rubber-modified styrene resin are often alloyed by melt mixing in order to make up for the defects of the polycarbonate resin. More particularly, in the field of automobiles, since size stability is also required in addition to the heat resistance, the impact resistance, and the moldability, addition of an inorganic filler such as talc has been attempted for such improvement. However, the inorganic fillers of silicate salt compounds such as talc are alkaline and when they are blended in the polycarbonate resin, there has been the problems of poor stability in retention and loss of mechanical properties by the resin decomposition by the alkali as well as poor appearance of the molded article such as silver streaks.

As a conventional technology of blending an inorganic filler of a silicate salt compound such as talc to a polycarbonate resin/rubber-modified styrene resin alloy, Patent Document 1 discloses a resin composition containing an aromatic polycarbonate resin, a styrene resin, a polyester resin, and an inorganic filler in particular compositions. The resin composition described in Patent Document 1 certainly exhibited improved stability in retention and appearance of the molded article while the improvement was insufficient, and it also suffered from the problem of insufficient balance of the mechanical properties. Patent Document 2 discloses a resin composition of particular composition comprising an aromatic polycarbonate, a graft Copolymer prepared by graft polymerization of at least an aromatic vinyl compound to a rubber matrix which is substantially free from the conjugated diene component, an aromatic vinyl copolymer, and an inorganic filler. The resin composition described in Patent Document 2 certainly exhibited excellent heat resistance, flowability, rigidity, impact resistance, and discoloration resistance while the improvement was insufficient, and the problems of insufficient stability in retention and appearance of molded article were not solved.

PATENT DOCUMENTS

Patent Document 1: Japanese Unexamined Patent Publication (Kokai) No. 2015-131876
Patent Document 2: Japanese Unexamined Patent Publication (Kokai) No. 2003-206398

SUMMARY OF THE INVENTION

An object of the present invention is to provide a thermoplastic resin composition exhibiting a good balance of mechanical properties, heat resistance, flowability, and size stability as well as high stability in retention during the molding, good appearance of the molded article, and excellent coating properties. Another object of the present invention is to provide a molded article prepared from such thermoplastic resin composition.

In order to solve the problems as described above, the inventors of the present invention made an intensive study and found that blending at a particular compositional ratio of the polycarbonate resin, the graft copolymer, the vinyl copolymer, crystalline resin, and the plate-shaped inorganic filler realizes a good balance between mechanical properties, heat resistance, flowability, and size stability as well as excellent stability in retention in the molding, appearance of the molded article and coating properties. The present invention has been completed by such finding.

Accordingly, the present invention is constituted by the following (1) to (7).

(1) A thermoplastic resin composition prepared by blending a polycarbonate resin (I), a graft copolymer (II), a vinyl copolymer (III) prepared by copolymerizing at least an aromatic vinyl monomer and a vinyl cyanide monomer, a crystalline resin (IV), and a plate-shaped inorganic filler (V); wherein
  the graft copolymer (II) is
  a graft copolymer (II-1) prepared by graft polymerization of a monomer mixture containing at least an aromatic vinyl monomer and a vinyl cyanide monomer in the presence of a diene rubbery polymer, or
  a graft copolymer (II-2) prepared by graft polymerization of a monomer mixture containing an aromatic vinyl monomer and a vinyl cyanide monomer in the presence of an acryl rubbery polymer prepared by copolymerizing an acrylate monomer and a polyfunctional monomer, and
  content of the polycarbonate resin (I) is 50 to 70% by weight, the graft copolymer (II) is 3 to 15% by weight, the vinyl copolymer (III) is 10 to 25% by weight, the crystalline resin (IV) is 1 to 9% by weight, and the inorganic filler (V) is 10 to 20% by weight in relation to 100% by weight of total content of the polycarbonate resin (I), the graft copolymer (II), the vinyl copolymer (III), the crystalline resin (IV), and the inorganic filler (V), and content of the crystalline resin (IV) in relation to 100% by weight of the inorganic filler (V) is at least 10% by weight and less than 50% by weight.
(2) A thermoplastic resin composition according to the above (1) wherein the crystalline resin (IV) is polybutylene terephthalate resin.

(3) A thermoplastic resin composition according to the above (1) or (2) wherein the plate-shaped inorganic filler (V) is talc.

(4) A thermoplastic resin composition according to any one of the above (1) to (3) wherein content of the crystalline resin (IV) in relation to 100% by weight of the plate-shaped inorganic filler (V) is at least 20% by weight and up to 40% by weight.

(5) A thermoplastic resin composition according to any one of the above (1) to (4) wherein the polycarbonate resin (I) has a viscosity average molecular weight of at least 10,000 and up to 21,000.

(6) A thermoplastic resin composition according to any one of the above (1) to (5) wherein temperature of exothermic peak corresponding to crystallization of the crystalline resin (IV) expressed in the temperature descending stage in differential scanning calorimetry is at least 185° C.

(7) An article prepared by molding the thermoplastic resin composition according to any one of the above (1) to (6).

The products the present invention enjoy a good balance between mechanical properties, heat resistance, flowability, and size stability as well as excellent stability in retention in the molding, appearance of the molded article and coating properties. Accordingly, production of molded articles having a large size and complicated shape as well as production of thin molded articles that could not be produced by conventional art has been enabled. The present invention has not only enabled to cope with the larger size and complicated shape of the product but also enabled to reduce cost of the product by thinning the product.

BRIEF DESCRIPTION OF THE DRAWINGS

FIG. 1(a) is a plan view.

DETAILED DESCRIPTION OF EMBODIMENTS OF THE INVENTION

Figure 1A:
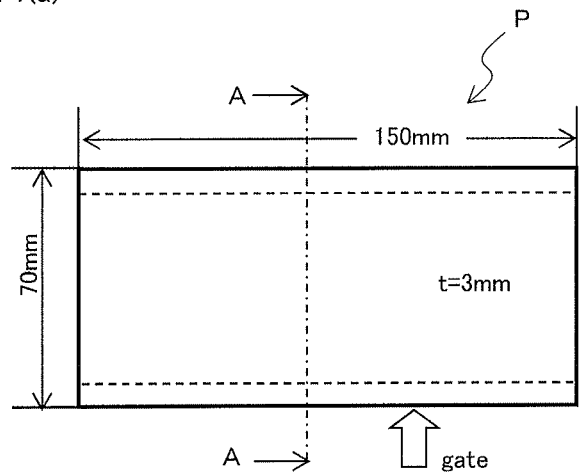
FIGS. 1(a) and (b) are illustrative views schematically showing the rectangular plate used in the Examples of the present specification.

Next, the thermoplastic resin composition of the present invention and the molded article prepared therefrom are described in detail.

The polycarbonate resin (I) used in the present invention is a resin having a repetitive structural unit represented by the following general formula (1):

[Chemical Formula 1]

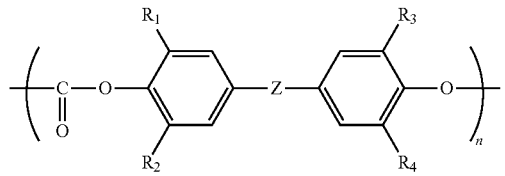

wherein Z is an optionally substituted alkylidene group containing 2 to 5 carbon atoms, cyclohexylidene group, oxygen atom, sulfur atom, or sulfonyl group, $R_1$, $R_2$, $R_3$, and $R_4$ are independently hydrogen atom or an alkyl group containing 1 to 6 carbon atoms.

The polycarbonate resin (I) may be prepared by reacting an aromatic dihydroxy compound which is typically 2,2-bis (4-hydroxyphenyl)propane or 2,2-bis(3,5-dimethyl-4-hydroxyphenyl)propane and a carbonate precursor which is typically phosgene.

Examples of the aromatic dihydroxy compound include bis(hydroxyaryl)alkanes such as 2,2-bis(4-hydroxyphenyl) propane (hereinafter sometimes referred to as "bisphenol A"), 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, and bis(4-hydroxyphenyl)diphenylmethane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,3,5-trimethylcyclohexane; cardo structure-containing bisphenols such as 9,9-bis(4-hydroxyphenyl)fluorene, and 9,9-bis(4-hydroxy-3-methylphenyl)fluorene; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; and hydroquinone, resorcin, and 4,4'-dihydroxy diphenyl.

Of these, the preferred are bis(4-hydroxyphenyl)alkane, and the most preferred is bisphenol A. These aromatic dihydroxy compounds may be used alone or in combination of two or more or as a copolymer thereof.

Examples of the carbonate precursor to be reacted with the aromatic dihydroxy compound include carbonyl halides, carbonate esters, and haloformates, specific examples including phosgene; diaryl carbonates such as diphenyl carbonate and ditolyl carbonate; dialkyl carbonates such as dimethyl carbonate and diethyl carbonate; and dihaloformates such as dihydric phenol. Of these, the preferred is Phosgene. The carbonate precursor may be used alone or in combination of two or more.

The method used for producing the polycarbonate resin (I) which constitutes the thermoplastic resin composition of the present invention is not particularly limited, and the polycarbonate resin (I) may be produced by a method known in the art. Exemplary such methods include interfacial polymerization process (phosgene process), melt transesterification process, solution polymerization process (pyridine process), ring-opening polymerization of cyclic carbonate compound, and solid phase transesterification of prepolymer.

In the case of the interfacial polymerization process which is a typical production method, the aromatic dihydroxy compound and the optional molecular weight regulating agent (end terminator) and antioxidant for preventing the oxidation of the aromatic dihydroxy compound are reacted with the phosgene in the presence of an organic solvent and an alkaline aqueous solution which will not be involved in the reaction by maintaining the pH in the range of at least 9, and then, a polymerization catalyst such as a tertiary amine or a quaternary ammonium salt is added to promote the interfacial polymerization to thereby obtain the polycarbonate resin. The timing of adding the molecular weight regulating agent is not particularly limited as long as the addition is conducted at a timing between the phosgene addition to the initiation of the polymerization. Typical reaction temperature is 0 to 40° C., and typical reaction time is 2 to 5 hours.

The organic solvent which can be used in the interfacial polymerization is not particularly limited as long as it will be inert and will not be involved in the interfacial polymerization, it is immiscible with water, and it can dissolve the polycarbonate resin. Exemplary such organic solvents include hydrocarbon chlorides such as dichloromethane, 1,2-dichloroethane, tetrachloroethane, chloroform, monochlorobenzene, and dichlorobenzene and aromatic hydrocarbons such as benzene, toluene, and xylene. Examples of the alkaline compound used for preparing the alkaline aqueous solution include hydroxides of an alkaline metal such as sodium hydroxide and potassium hydroxide.

Examples of the molecular weight regulating agent include compounds having a hydroxy group of a monohydric phenol and phenyl chloroformate, and examples of the compound having a hydroxy group of a monohydric phenol include m-methyl phenol, p-methyl phenol, m-propyl phenol, p-propyl phenol, p-tert-butylphenol, and p-long chain alkyl-substituted phenol. The molecular weight regulating agent is preferably used in an amount of 0.1 to 1 mole in relation to 100 moles of the aromatic dihydroxy compound.

Exemplary polymerization catalysts include tertiary amines such as trimethylamine, triethylamine, tributylamine, tripropylamine, trihexylamine, and pyridine; and quaternary ammonium salts such as trimethylbenzyl ammonium chloride, tetrabutyl ammonium chloride, tetramethyl ammonium chloride, triethylbenzyl ammonium chloride, and trioctylmethyl ammonium chloride.

In the thermoplastic resin composition of the present invention, content of the polycarbonate resin (I) is typically in the range of 50 to 70% by weight, preferably 52 to 68% by weight, and more preferably 55 to 65% by weight when the total content of the polycarbonate resin (I), the graft copolymer (II), the vinyl copolymer (III), the crystalline resin (IV), and the inorganic filler (V) is 100% by weight. Use of the polycarbonate resin (I) in an amount of less than 50% by weight is unpreferable since the impact resistance and the heat resistance will be inferior despite the improvement in the flowability. In the meanwhile, use in an amount in excess of 70% by weight is unpreferable due to insufficient flowability in the injection molding and incapability of molding some types of products despite the improved impact resistance and heat resistance.

In the present invention, the polycarbonate resin (I) is not particularly limited for its viscosity average molecular weight ($M_v$). However, the viscosity average molecular weight ($M_v$) is preferably at least 10,000 and up to 21,000, more preferably at least 12,000 and up to 20,000, and most preferably at least 15,000 and up to 18,000. The $M_v$ of at least 10,000 is preferable in view of the improved mechanical properties such as impact resistance and heat resistance, and the $M_v$ of up to 21,000 is preferable in view of the improved flowability and the improved appearance of the molded article.

In the present invention, the viscosity average molecular weight ($M_v$) of the polycarbonate resin (I) may be determined by the following procedure. First, specific viscosity ($\eta_{SP}$) is determined for the solution (concentration c, 0.7) prepared by dissolving 0.7 g of the polycarbonate resin (I) in 100 ml of methylene chloride at 20° C. by using Ostwald viscometer. The specific viscosity ($\eta_{SP}$) is determined by the following equation:

specific viscosity $(\eta_{SP}) = (t-t_0)/t_0$

[wherein $t_0$ is falling time in seconds of the methylene chloride, and t is falling time in seconds of the sample solution]

Next, viscosity average molecular weight $M_v$ is calculated from the thus determined specific viscosity ($\eta_{SP}$) by the following equation of Schnell:

$\eta_{SP}/c = [\eta] + 0.45 \times [\eta]^2 c$ (wherein $[\eta]$ is limiting viscosity)

$[\eta] = 1.23 \times 10^{-4} M_v^{0.83}$

The graft copolymer (II) constituting the thermoplastic resin composition of the present invention is a graft copolymer (II-1) prepared by graft polymerization of a monomer mixture containing at least an aromatic vinyl monomer (B) and a vinyl cyanide monomer (C) in the presence of a diene rubbery polymer (A1), or a graft copolymer (II-2) prepared by graft polymerization of a monomer mixture containing an aromatic vinyl monomer (B) and a vinyl cyanide monomer (C) in the presence of an acryl rubbery polymer (hereinafter sometimes referred to as "acryl rubbery polymer (A2)") produced by copolymerizing an acrylate monomer and a polyfunctional monomer.

Graft Copolymer (II-1)

The thermoplastic resin composition containing the graft copolymer (II-1) exhibits good balance between mechanical properties, heat resistance, flowability, and size stability as well as excellent stability in retention in the molding, appearance of the molded article, and coating properties.

The diene rubbery polymer (A1) which can be used for the graft copolymer (II-1) is preferably the one having a glass transition temperature of up to 0° C., and the lower limit is approximately –80° C. in practical point of view. Examples of the diene rubbery polymer that can be used include polybutadiene, styrene-butadiene copolymer, acrylonitrile-butadiene copolymer, styrene-butadiene block copolymer, and butyl acrylate-butadiene copolymer, and of these, the preferred is polybutadiene.

The diene rubbery polymer (A1) is not limited for its weight average particle diameter, and the weight average particle diameter is preferably 100 to 1200 nm and more preferably 200 to 1200 nm. Use of a diene rubbery polymer (A1) having a weight average particle diameter of less than 100 nm may invite decrease of the impact resistance while use of the one having a weight average particle diameter in excess of 1200 nm may invite decrease of the flowability.

The diene rubbery polymer (A1) may preferably comprise a combination of two diene rubbery polymers, namely, the one having a small particle diameter with the weight average particle diameter of 200 to 400 nm and the one having a large particle diameter with the weight average particle diameter of 450 to 1200 nm, more preferably the one having a small particle diameter with the weight average particle diameter of 280 to 400 nm and the one having a large particle diameter With 600 to 1200 nm, and still more preferably the one having a small particle diameter with the weight average particle diameter of 320 to 380 nm and the one having a large particle diameter with 700 to 1100 nm in view of simultaneously improving the impact resistance and the flowability.

When two types of diene rubbery polymers (A1) are used as described above, weight ratio of the one having a small particle diameter and the one having a large particle diameter is preferably in the range of 90:10 to 50:50, more preferably 80:20 to 60:40, and still more preferably 75:25 to 65:35 in view of the impact resistance and the flowability.

The weight average particle diameter of the diene rubbery polymer (A1) can be determined by sodium alginate method (a method wherein the particle diameter at 50% cumulative weight fraction is determined from weight ratio of the sodium alginate and cumulative weight fraction of the sodium alginate concentration) described in Rubber Age, Vol. 88, pp. 484 to 490 (1960) by E. Schmidt, P. H. Biddison.

The weight fraction of the diene rubbery polymer (A1) in the graft copolymer (II) is preferably adjusted to 40 to 65% by weight, and the weight fraction of the diene rubbery polymer (A1) is more preferably 40 to 60% by weight, and still more preferably 40 to 50% by weight. The weight fraction of at least 40% by weight is preferable in view of improving the impact resistance and the weight fraction of up to 65% by weight is preferable in view of improving the flowability.

Examples of the aromatic vinyl monomer (B) in the monomer mixture include styrene, α-methylstyrene, vinyl toluene, o-ethylstyrene, p-methylstyrene, chlorostyrene, and bromostyrene, and the most preferred is styrene.

Examples of the vinyl cyanide monomer (C) in the monomer mixture include acrylonitrile, methacrylonitrile, and ethacrylonitrile, and the most preferred is acrylonitrile.

The monomer mixture may also contain an additional vinyl monomer which can copolymerize with the aromatic vinyl monomer (B) and the vinyl cyanide monomer (C) to the extent not adversely affecting the present invention. Examples of such vinyl monomer include N-phenylmaleimide, N-methylmaleimide, and methyl methacrylate which may be used alone or in combination of two or more, and a suitable vinyl monomer may be selected according to the intended purpose of the addition. In view of further improving the heat resistance and the flame retardancy, the preferred is use of the N-phenylmaleimide, and in view of the importance of improving the hardness, use of the methyl methacrylate is preferable.

Weight fraction of the aromatic vinyl monomer (B) in the graft copolymer (II-1) is preferably 26 to 43% by weight, more preferably 30 to 41% by weight, and most preferably 35 to 41% by weight. Coloring is less likely to occur when the weight fraction of the aromatic vinyl monomer (B) is at least 26% by weight while progress of the graft polymerization is likely to be promoted with the increase in the graft rate and improvement of the impact resistance when the weight fraction is up to 43% by weight.

Weight fraction of the vinyl cyanide monomer (C) in the graft copolymer (II-1) is preferably 9 to 17% by weight, more preferably 10 to 16% by weight, and still more preferably 12 to 16% by weight. Progress of the graft polymerization is likely to be promoted with the increase in the graft rate and improvement of the impact resistance when the weight fraction of the vinyl cyanide monomer (C) is at least 9% by weight while the coloring is less likely to occur when the weight fraction is up to 17% by weight.

The graft copolymer (II-1) is not particularly limited for its graft rate. However, in view of the balance between the impact resistance and the flowability, the graft rate is preferably 7 to 30%, more preferably 20 to 28%, and still more preferably 22 to 26%. The graft rate (%) is represented by the following equation:

Graft rate (%)=[amount of the vinyl polymer graft-polymerized with the diene rubbery polymer]/ [rubber content of the graft copolymer]×100

Examples of the graft copolymer (II-1) include acrylonitrile-butadiene-styrene graft copolymer (ABS resin), methyl methacrylate-butadiene-styrene graft copolymer (MBS resin), and methyl methacrylate-acrylonitrile-butadiene-styrene graft copolymer (MABS resin). Of these, the preferred is the acrylonitrile-butadiene-styrene graft copolymer (ABS resin).

Graft Copolymer (II-2)

The thermoplastic resin composition containing the graft copolymer (II-2) exhibits good balance between mechanical properties, heat resistance, flowability, and size stability as well as excellent stability in retention in the molding, appearance of the molded article, and coating properties. The thermoplastic resin composition containing the graft copolymer (II-2) also exhibits excellent weatherability in addition to the properties as described above.

The acrylate monomer (a) constituting the acryl rubbery polymer (A2) produced by copolymerizing the acrylate monomer (a) and a polyfunctional monomer (b) which can be used for the graft copolymer (II-2) is preferably an alkyl group containing 1 to 10 carbon atoms, and examples include methyl acrylate, ethyl acrylate, n-butyl acrylate, t-butyl acrylate, and octyl acrylate, which may be used in combination of two or more. Of these, the preferred is n-butyl acrylate.

The polyfunctional monomer (b) constituting the acryl rubbery polymer (A2)' is not particularly limited as long as it contains two or more functional groups, and exemplary functional groups include groups having a carbon-carbon double bond such as allyl group and (meth)acryloyl group. Examples of the polyfunctional monomer ('b) include allyl compounds such as allyl acrylate, allyl methacrylate, diallyl maleate, triallyl cyanurate, and triallyl isocyanurate, divinylbenzene, and di(meth)acrylate compounds such as ethylene glycol dimethacrylate, diethylene glycol dimethacrylate, and propylene glycol dimethacrylate, which may be used in combination of two or more. Of these, the preferred is allyl methacrylate in view of the ease of adjusting the gel swelling rate of the acryl rubbery polymer (A2) in toluene and the graft rate of the graft copolymer (II-2) as described below to the desired range.

The acryl rubbery polymer (A2) of the present invention is preferably produced by copolymerizing 97 to 99.5% by weight of the acrylate monomer (a) and 3 to 0.5% by weight of the polyfunctional monomer (b) in relation to 100% by weight of the total of the acrylate monomer (a) and the polyfunctional monomer (b). When the acrylate monomer (a) is at least 97% by weight and the polyfunctional monomer (b) is up to 3% by weight, the gel swelling rate of the acryl rubbery polymer (A2) in toluene as will be described below will be increased and the graft rate of the graft copolymer (II-2) as will be described below will be reduced. As a consequence, flowability of the thermoplastic resin composition will be improved, and since a structure of aggregated particles of the graft copolymer (II-2) is present, the molded article will have improved impact strength and surface impact resistance. Preferably, the acrylate monomer (a) is at least 98% by weight and the polyfunctional monomer (b) is up to 2% by weight, and more preferably, the acrylate monomer (a) is in excess of 98.5% by weight and the polyfunctional monomer (b) is less than 1.5% by weight. In the meanwhile, it is preferable that the acrylate monomer (a) is up to 99.5% by weight and the polyfunctional monomer (b) is at least 0.5% by weight since the graft rate of the graft copolymer (II-2) as will be described below will be improved and the molded article will have improved impact strength and surface impact resistance. The acrylate monomer (a) is preferably up to 99.3% by weight and more preferably up to 99.0% by weight, and the polyfunctional monomer (b) is preferably at least 0.7% by weight and more preferably 1.0% by weight.

In the present invention, the acryl rubbery polymer (A2) preferably has a volume average particle diameter in the range of 0.10 to 0.30 μm. When the volume average particle diameter of the acryl rubbery polymer (A2) is at least 0.10 μm, primary particles in the aggregated particle as will be described below will retain its original shape and the impact strength and the surface impact resistance of the molded article will be improved. The volume average particle diameter is more preferably at least 0.15 μm. On the other hand, when the volume average particle diameter of the acryl rubbery polymer (A2) is up to 0.30 μm, dispersibility of the graft copolymer (II-2) in the thermoplastic resin composition Will be improved, and this leads to the improvement of the impact resistance and surface impact resistance of the molded article. The volume average particle diameter is more preferably up to 0.25 μm.

The volume average particle diameter of the acryl rubbery polymer (A2) may be determined by dispersing latex of the acryl rubbery polymer (A2) in water and measuring the volume average particle diameter by using a particle size distribution measuring system which uses laser light scattering and diffraction.

The volume average particle diameter of the acryl rubbery polymer (A2) may be adjusted to the desired range, for example, by changing the amount of water, emulsifier, polymerization initiator, and the like used in the polymerization.

The gel swelling rate (α) of the acryl rubbery polymer (A2) in toluene is preferably at least 10 folds. The gel swelling rate (α) is an index indicating the degree of cross-linking of the acryl rubbery polymer (A2), and when the gel swelling rate (α) is at least 10 folds, aggregation of the graft copolymer (II-2) particles will be facilitated and flowability of the thermoplastic resin composition and the impact strength and the surface impact resistance of the molded article will be improved. The gel swelling rate (α) is more preferably at least 12 folds.

The gel swelling rate (α) of the acryl rubbery polymer (A2) in toluene can be determined by the following procedure. First, in the case of acryl rubbery polymer (A2) latex, the latex and sulfuric acid are added to methanol, and solidified acryl rubbery polymer (A2) is obtained by dehydration and washing. The resulting solidified acryl rubbery polymer (A2) is dried in vacuum at 80° C. for 3 hours, and a predetermined amount is impregnated with toluene for 24 hours, and the weight (y) [g] of the swollen sample is measured. Subsequently, the sample is dried in vacuum at 80° C. for 3 hours, and the weight of the dried sample (z) [g] is measured. The gel swelling rate (α) is calculated from the swollen sample weight (y) [g] and the dried sample weight (z) [g] by the following equation:

Gel swelling rate (fold)=$(y)/(z)$

The gel swelling rate of the acryl rubbery polymer (A2) in toluene may be adjusted, for example, depending on the amount of the polyfunctional monomer, the emulsifier, and the initiator used in the polymerization. For example, with regard to the copolymerization rate of the polyfunctional monomer, the acrylate monomer (a) is preferably in excess of 98.5% by weight and the polyfunctional monomer (b) is preferably less than 1.5% by weight.

The gel content of the acryl rubbery polymer (A2) in toluene is preferably 80 to 98% by weight. When the gel content is at least 80% by weight and up to 98% by weight, elasticity of the acryl rubbery polymer (A2) will be improved and the molded article will have an improved impact resistance and surface impact resistance. The gel content is more preferably up to 85 to 95% by weight.

The gel content of the acryl rubbery polymer (A2) in toluene can be determined by the following procedure. First, in the case of acryl rubbery polymer (A2) latex, the latex and sulfuric acid are added to methanol, and solidified acryl rubbery polymer (A2) is obtained by dehydration and washing. The resulting solidified acryl rubbery polymer (A2) is dried in vacuum at 80° C. for 3 hours, and a predetermined amount (x) [g] is impregnated with toluene for 24 hours, and the weight (y) [g] of the swollen sample is measured. Subsequently, the sample is dried in vacuum at 80° C. for 3 hours, and the weight of the dried sample (z) [g] is measured. The gel content is calculated from the sample weight (x)[g] and the dried sample weight (z) [g] by the following equation:

Gel content (% by Weight)=$([z]/[x]) \times 100$

The gel content of the acryl rubbery polymer (A2) may be adjusted to the desired range, for example, depending on the amount of the polyfunctional monomer, the emulsifier, and the initiator used in the polymerization.

The polymerization of the acryl rubbery polymer (A2) may be accomplished by any one of the emulsion polymerization, the suspension polymerization, the continuous bulk polymerization, and the solution continuous polymerization processes, which may be used in combination of two or more. Of these, the preferred are the emulsion polymerization process and the bulk polymerization process, and the most preferred is the emulsion polymerization process in view of the ease of controlling the volume average particle diameter to the desired range by heat removal during the polymerization.

The emulsifier used in the emulsion polymerization process is not particularly limited, and various surfactants can be used in this process. Exemplary preferable surfactants include anionic surfactants such as carboxylate surfactants, sulfate ester surfactants, and sulfonate surfactants, which may be used in combination of two or more.

Examples of the anionic surfactant include caprylate salts, caprate salts, laurylate salts, myristate salts, palmitate salts, stearate salts, oleate salts, linolate salts, linolenate salts, behenate salts, salts of sulfated castor oil, salts rosinate salts, of sulfated lauryl alcohol, dodecylbenzenesulphonate salts, alkyl naphthalene sulfonate salts, alkyl diphenyl ether disulfonate salts, condensates of naphthalene sulfonate salts, dialkylsulfosuccinate salts, polyoxyethylene laurylsulphate salts, polyoxyethylene alkylether sulphate salts, and polyoxyethylene alkylphenylether sulphate salts. The salt as used herein includes ammonium salts and alkali metal salts such as sodium salts, lithium salts, and potassium salts.

The initiator used for the polymerization is not particularly limited, and examples include peroxides, azo compounds, and persulphates.

Examples of the peroxide include benzoyl peroxide, cumene hydroperoxide, dicumyl peroxide, diisopropylbenzene hydroperoxide, t-butyl hydroperoxide, t-butylperoxy acetate, t-butylperoxy benzoate, t-butylisopropyl carbonate, di-t-butyl peroxide, t-butyl peroctate, 1,1-bis(t-butylperoxy) 3,3,5-trimethylcyclohexane, 1,1-bis(t-butylperoxy)cyclohexane, and t-butylperoxy-2-ethyl hexanoate.

Examples of the azo compounds include azobisisobutyronitrile, azobis(2,4-dimethylvaleronitrile), 2-phenylazo-2, 4-dimethyl-4-methoxyvaleronitrile, 2-cyano-2-propylazoformamide, 1,1'-azobiscyclohexane-1-carbonitrile, azobis (4-methoxy-2,4-dimethylvaleronitrile), dimethyl 2,2'- azobisisobytylate, 1-t-butylazo-2-cyanobutane, and 2-t-butyl azo-2-cyano-4-methoxy-4-methylpentane.

Examples of the persulphate include potassium persulphate, sodium persulphate, and ammonium persulphate.

These initiator may be used in combination of two or more. In the emulsion polymerization process, the preferred is use of potassium persulphate or cumene hydroperoxide. The initiator used may also be a redox initiator.

In view of adjusting the volume average particle diameter of the acryl rubbery polymer (A2) and the gel swelling rate and the gel content in the toluene to the preferable range as described above, in the polymerization of the acryl rubbery polymer (A2), 80 to 200 parts by weight of the water, 1.5 to 5 parts by weight of the emulsifier, and 0.05 to 0.5 part by weight of the initiator are preferably used in relation to 100 parts by weight of the total of the acrylate monomer (a) and the polyfunctional monomer (b).

The graft copolymer (II-2) used in the present invention is produced by graft polymerization of a monomer mixture containing an aromatic vinyl monomer (B) and a vinyl cyanide monomer (C) in the presence of the acryl rubbery polymer (A2). In other words, the graft copolymer (II-2) is a copolymer produced by graft polymerization of a monomer mixture containing an aromatic vinyl monomer and a vinyl cyanide monomer with the acryl rubbery polymer (A2).

Amount of the acryl rubbery polymer (A2) blended is preferably at least 20 parts by weight and more preferably 30 parts by weight in relation to 100 parts by weight of the total of the acryl rubbery polymer (A2) and the monomer mixture constituting the graft copolymer (II-2). In the meanwhile, amount of the blended is preferably up to 70 parts by weight and more preferably up to 60 parts by weight. Amount of the monomer mixture blended is preferably at least 30 parts by weight and more preferably at least 40 parts by Weight while amount of the monomer mixture blended is preferably up to 80 parts by weight and more preferably up to 70 parts by weight.

The monomer mixture constituting the graft copolymer (II-2) contains an aromatic vinyl monomer (B) and vinyl cyanide monomer (C), and if desired, a monomer which can Copolymerize with these monomers.

Examples of the aromatic vinyl monomer (B) include styrene, α-methylstyrene, p-methylstyrene, m-methylstyrene, o-methylstyrene, and t-butyl styrene, which may be used in combination of two or more. Of these, the preferred is styrene.

Examples of the vinyl cyanide monomer (C) include acrylonitrile, methacrylonitrile, and ethacrylonitrile, which may be used in combination of two or more. Of these, the preferably preferred is acrylonitrile.

The additional copolymerizable monomer is not particularly limited as long as the merits of the present invention are not adversely affected, and examples include alkyl ester monomers of an unsaturated carboxylic acid, unsaturated fatty acids, acrylamide monomers, and maleimide monomers, which may be used in combination of 2 or more.

Examples of the alkyl ester monomer of an unsaturated carboxylic acid include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, and chloromethyl (meth)acrylate, which may be used in combination of two or more.

Examples of the unsaturated fatty acid include itaconic acid, maleic acid, fumaric acid, butenoic acid, acrylic acid, and methacrylic acid, which may be used in combination of two or more.

Examples of the acrylamide monomer include acrylamide, methacrylamide, and N-methylacrylamide, which may be used in combination of two or more.

Examples of the maleimide monomer include N-methylmaleimide, N-isopropylmaleimide, N-butylmaleimide, N-hexylmaleimide, N-octylmaleimide, N-dodecylmaleimide, N-cyclohexylmaleimide, and N-phenylmaleimide, which may be used in combination of two or more.

The mixing ratio of the monomer mixture is preferably in the range of 60 to 80% by weight of the aromatic vinyl monomer (B), 20 to 40% by weight of the vinyl cyanide monomer (C), and 0 to 20% by weight of other copolymerizable monomers in 100% by weight of the total monomer mixture.

Graft rate (β) of the graft copolymer (II-2) is preferably 5 to 40%. The graft rate (β) is an index indicating compatibility of the graft copolymer (II-2), and when the graft rate is at least 5%, compatibility of the graft copolymer (II-2) in the thermoplastic resin composition will be improved, and the impact strength and the surface impact resistance of the molded article will be improved. The graft rate (β) is more preferably at least 8%. In the meanwhile, when the graft rate is up to 40%, aggregation of the graft copolymer (II-2) particles in the thermoplastic resin composition will be facilitated and the impact strength and surface impact resistance of the molded article will be improved. The graft rats (β) is more preferably up to 35% and still more preferably up to 30%.

The graft rate (β) of the graft copolymer (II-2) can be determined by the following procedure. First, 100 ml of acetonitrile is added to a predetermined amount (m, about 1.5 g) of the graft copolymer (II-2) which had been dried in vacuum at 80° C. for 3 hours, and the solution is refluxed in a hot water bath at 70° C. for 3 hours. The solution is then centrifuged at 9000 rpm for 40 minutes, and the insoluble content is separated by filtration. This insoluble content is dried in vacuum at 80° C. for 5 hours and its weight (n; unit, g) is measured. The graft rate (β) is calculated by the following equation:

$$\text{Graft rate (\%)} = \{[(n)-((m) \times L/100)]/[(m) \times L/100]\} \times 100$$

wherein L represents rubber content (% by weight) of the graft copolymer (namely, content (% by weight) of the acryl rubbery polymer (A2) in the graft copolymer (II-2))

The graft rate of the graft copolymer (II-2) may be adjusted to the desired range, for example, depending on the amount of the chain transfer agent, the emulsifier, or the initiator used for the polymerization by using the acryl rubbery polymer (A2) as described above.

The polymerization of the graft copolymer (II-2) may be accomplished by any one of the emulsion polymerization, the suspension polymerization, the continuous bulk polymerization, and the solution continuous polymerization processes, which may be used in combination of two or more. Of these, the preferred are the emulsion polymerization process and the bulk polymerization process, and the most preferred is the emulsion polymerization process in view of the ease of controlling the temperature in the polymerization.

The emulsifier used in the emulsion polymerization process of the graft copolymer (II-2) may be the one mentioned for the emulsifier in the emulsion polymerization process of the acryl rubbery polymer (A2). The polymerization initiator used in the polymerization of the graft copolymer (II-2) may be the one mentioned for the polymerization initiator in the polymerization of the acryl rubbery polymer (A2).

A chain transfer agent may be used for the purpose of adjusting the degree of polymerization and the graft rate of the graft copolymer (II-2). Exemplary such chain transfer agents include mercaptans such as n-octylmercaptan, t-dodecylmercaptan, n-dodecylmercaptan, n-tetradecylmercaptan, and n-octadecylmercaptan and terpenes such as terpinolene, which may be used in combination of two or more. Of these, the preferred are n-octyl mercaptan and t-dodecyl mercaptan.

In view of adjusting the graft rate of the graft copolymer (II-2) to the preferable range as described above, in the polymerization of the graft copolymer (II-2), amount of the chain transfer agent used is preferably 0.05 to 0.5 part by weight, the amount of the emulsifier used is preferably 0.5 to 5 parts by weight, and the amount of the initiator used is preferably 0.1 to 0.5 part by weight in relation to 100 parts by weight of the total of the acryl rubbery polymer (A2) and the monomer mixture.

The graft copolymer (II-2) may be collected by adding a coagulant to the graft copolymer (II-2) latex prepared by emulsion polymerization. The coagulant used may be an acid or a water-soluble salt. Examples of the coagulant include acids such as sulfuric acid, hydrochloric acid, phosphoric acid, and acetic acid and water-soluble salts such as calcium chloride, magnesium chloride, barium chloride, aluminum chloride, magnesium sulfate, aluminum sulfate, aluminum ammonium sulfate, aluminum potassium sulfate, and aluminum sodium sulfate, which may be used in combination of two or more. When the coagulant used is an acid, the method used may be the one wherein the graft copolymer (II-2) is collected after neutralizing the acid with an alkali.

In the method as described above, the monomer mixture containing an aromatic vinyl monomer and a vinyl cyanide monomer is graft-copolymerized with the acryl rubbery polymer (A2) by the method as described above. However, all of the monomer mixture containing the vinyl cyanide monomer may not necessarily be graft-copolymerized to the acryl rubbery polymer (A2). Accordingly, the graft copolymer (II-2) of the present invention may contain a copolymer comprising the monomer mixture containing the aromatic vinyl monomer and the vinyl cyanide monomer which are not graft-copolymerized to the acryl rubbery polymer (A2).

Examples of the graft copolymer (II-2) include acrylonitrile-acryl rubbery polymer-styrene graft copolymer (ASA resin), methyl methacrylate-acryl rubbery polymer-styrene graft copolymer (MSA resin), and methyl methacrylate-acrylonitrile-acryl rubbery polymer-styrene graft copolymer (MASA resin), and of these, the preferred is acrylonitrile-acryl rubbery polymer-styrene graft copolymer (ASA resin).

In the thermoplastic resin composition of the present invention, content of the graft copolymer (II) is typically in the range of 3 to 15% by weight, preferably 4 to 14% by weight, and more preferably 5 to 13% by weight in relation to 100% by weight of the total of the polycarbonate resin (I), the graft copolymer (II), the vinyl copolymer (III), the crystalline resin (IV), and the inorganic filler (V). When the amount of the graft copolymer (II) is less than 3% by weight, the impact resistance is likely to be reduced, and the amount in excess of 15% by weight is unpreferable since the flowability is likely to be reduced.

The vinyl copolymer (III) constituting the thermoplastic resin composition of the present invention is a vinyl copolymer produced by copolymerizing at least an aromatic vinyl monomer (D) and a vinyl cyanide monomer (E). The vinyl copolymer (III) is preferably the one produced by copolymerizing 60 to 85% by weight of the aromatic vinyl monomer (D) and 15 to 40% by weight of the vinyl cyanide monomer (E), more preferably 65 to 80% by weight of the aromatic vinyl monomer (D) and 20 to 35% by weight of the vinyl cyanide monomer (E), and still more preferably 70 to 80% by weight of the aromatic vinyl monomer (D) and 20 to 30% by weight of the vinyl cyanide monomer (E). When the aromatic vinyl monomer (D) is at least 60% by weight, compatibility with the polycarbonate resin (I) will be improved, and this contributes for the improvement of mechanical properties such as impact resistance. In the meanwhile, the aromatic vinyl monomer (D) of up to 85% by weight is preferable since compatibility with the graft copolymer (II) will be improved and this is also likely to contribute for the improvement of impact resistance. In the present invention, the vinyl copolymer (III) does not contain the diene rubbery polymer (A1) and the acryl rubbery polymer (A2). In other words, the vinyl copolymer (III) is a copolymer which is different from the graft copolymer (II-1) and the graft copolymer (II-2).

Examples of the aromatic vinyl monomer (D) which is a constituent of the vinyl copolymer (III) include styrene, α-methylstyrene, vinyltoluene, o-ethylstyrene, p-methylstyrene, m-methylstyrene, t-butylstyrene, vinyltoluene, chlorostyrene, and bromostyrene as in the case of the aromatic vinyl monomer (B) in the graft copolymer (II). Of these, use of the styrene is preferable, and these may be used either alone or in combination of two or more. Of these, the use of the styrene is most preferable.

Examples of the vinyl cyanide monomer (E) which is the constituent of the vinyl copolymer (III) include acrylonitrile, methacrylonitrile, and ethacrylonitrile as in the case of the vinyl cyanide monomer (C) in the graft copolymer (II). Of these, use of the acrylonitrile is most preferable, and these may be used either alone or in combination of two or more.

As in the case of the graft copolymer (II), the vinyl copolymer (III) may be prepared by using an additional vinyl monomer which can copolymerize with the aromatic vinyl monomer (D) and the vinyl cyanide monomer (E) to the extent not adversely affecting the present invention. Examples of such vinyl monomer include N-phenylmaleimide, N-methylmaleimide, and methyl methacrylate which may be used alone or in combination of two or more, and a suitable vinyl monomer may be selected according to the intended purpose of the addition. In view of further improving the heat resistance and the flame retardancy, the preferred is use of the N-phenylmaleimide, and in view of the importance of improving the hardness, use of the methyl methacrylate is preferable.

The vinyl copolymer (III) which constitutes the thermoplastic resin composition of the present invention may preferably have an intrinsic viscosity as measured in methyl ethyl ketone solvent at 30° C. by Ubbelohde viscometer of 0.35 to 0.50 dl/g, more preferably 0.37 to 0.48 dl/g, and still more preferably 0.40 to 0.45 dl/g. The impact resistance is likely to be improved when the intrinsic viscosity is at least 0.35 dl/g, while the flowability is likely to be improved when the intrinsic viscosity is up to 0.50 dl/g.

Examples of the vinyl copolymer (III) include acrylonitrile-styrene copolymer (AS resin) and methyl methacrylate-styrene copolymer (MS resin). Of these, the preferred is acrylonitrile-styrene copolymer (AS resin).

In the thermoplastic resin composition of the present invention, content of the vinyl copolymer (III) is typically in the range of 10 to 25% by weight, preferably 12 to 23% by weight, and more preferably 15 to 20% by weight in relation to 100% by weight of the total of the polycarbonate resin (I), the graft copolymer (II), the vinyl copolymer (III), the crystalline resin (IV), and the inorganic filler (V). When the amount of the vinyl copolymer (III) is less than 10% by weight, the flowability is likely to be reduced, and the amount in excess of 25% by weight is also unpreferable since the impact resistance is likely to be reduced.

In the present invention, the method used for producing the graft copolymer (II-1) and the vinyl copolymer (III) is not particularly limited, and exemplary methods used include bulk polymerization, suspension polymerization, bulk suspension polymerization, solution polymerization, emulsion polymerization, precipitation polymerization, and combinations of these methods. The method used for charging the monomer is also not particularly limited, and the monomer may be charged at once in the initial stage or in several increments to promote or prevent the formation of the compositional distribution of the copolymer.

In the present invention, the preferable initiators used for the polymerization of the graft copolymer (II-1) and the vinyl copolymer (III) are peroxides and azo compounds.

Examples of the peroxide include benzoyl peroxide, cumene hydroperoxide, dicumyl peroxide, diisopropylbenzene hydroperoxide, t-butyl hydroperoxide, t-butylcumyl peroxide, t-butylperoxy acetate, t-butylperoxy benzoate, t-butylperoxy isopropyl carbonate, di-t-butyl peroxide, t-butyl peroctate, 1,1-bis(t-butylperoxy) 3,3,5-trimethylcyclohexane, 1,1-bis (t-butylperoxy) cyclohexane, and t-butylperoxy-2-ethyl hexanoate. Of these, the particularly preferred are cumene hydroperoxide and 1,1-bis(t-butylperoxy) 3,3,5-trimethylcyclohexane.

Examples of the azo compounds include azobisisobutyronitrile, azobis(2,4 dimethylvaleronitrile), 2-phenylazo-2,4-dimethyl-4-methoxyvaleronitrile, 2-cyano-2-propylazoformamide, 1,1'-azobiscyclohexane-1-carbonitrile, azobis (4-methoxy-2,4-dimethylvaleronitrile), dimethyl 2,2'-azobisisobutylate, 1-t-butylazo-1-cyanocyclohexane, 2-t-butylazo-2-cyanobutane, and 2-t-butylazo-2-cyano-4-methoxy-4-methylpentane, and the most preferred is azobisisobutyronitrile.

These initiators may be used either alone or in combination of two or more.

In the polymerization, a chain transfer agent such as mercaptan or terpene may be used for the purpose of adjusting the degree of polymerization of the graft copolymer (II-1) and the vinyl copolymer (III). Exemplary such chain transfer agents include n-octylmercaptan, t-dodecylmercaptan, n-dodecylmercaptan, n-tetradecylmercaptan, n-octadecylmercaptan, and terpinolene. Of these, the preferred are n-octylmercaptan, t-dodecylmercaptan, and n-dodecylmercaptan. These chain transfer agents may be used either alone or in combination of two or more.

In the thermoplastic resin composition of the present invention, the graft copolymer (II) may exhibit weak alkalinity, and in order to prevent alkali decomposition and thermal decomposition of the polycarbonate resin (I) which is a component of the present invention, an acidic compound may be added in the course of preparing the graft polymer or during the melt kneading in producing the resin composition. The acidic compound which may be used in the present invention is not particularly limited, and examples of the compound which may be used include hydrochloric acid, sulfuric acid, nitric acid, acetic acid, oxalic acid, malonic acid, succinic acid, maleic acid, adipic acid, sebacic acid, dodecanedioic acid, maleic anhydride, succinic anhydride, itaconic acid, benzoic acid, methyl benzoate, terephthalic acid, isophthalic acid, o-phthalic acid, naphthalene dicarboxylic acid, diphenic acid, phosphoric acid, and sodium dihydrogenphosphate. Preferred is use of maleic anhydride, succinic anhydride, phosphoric acid, and sodium dihydrogenphosphate, the more preferred is use of phosphoric acid and sodium dihydrogenphosphate. The acidic compound as mentioned above may be used alone or in combination of two or More.

As an index, amount of the acidic compound added is preferably up to 1.0 part by weight in relation to 100 parts by weight of the total of the (I) to (III). When the amount added is up to 1.0 part by weight, failure in the appearance of the surface and the like of the injection molded article is likely to be suppressed.

The crystalline resin (IV) constituting the thermoplastic resin composition of the present invention is not particularly limited as long as it is a resin having a melting point that can be used in melt molding. In view of the workability in the molding and heat resistance, however, the crystalline resin (IV) may preferably have a melting point of at least 150° C., more preferably at least 180° C., still more preferably at least 200° C., and most preferably at least 220° C. While the upper limit is not particularly limited, the melting point is preferably up to 300° C., more preferably up to 280° C., and still more preferably up to 250° C. It is to be noted that, in the present invention, the melting point of the crystalline resin (IV) is the endothermic peak temperature (Tm2) observed for 10 mg of the pellets of the crystalline resin (IV) in the differential scanning calorimetry using "DSC-60" manufactured by Shimadzu Corporation. More specifically, endothermic peak temperature (Tm1) is first observed for the pellets of the crystalline resin (IV) in the temperature range of 40° C. to 300° C. at a temperature elevation condition of 20° C./minute, and then, the endothermic peak temperature (Tm2) is observed by retaining the temperature at 300° C. for 1 minute, cooling at a temperature descending rate of 20° C./minute to 40° C., retaining the temperature for 1 minute, and again raising the temperature at a temperature increasing rate of 20° C./minute.

Examples of the crystalline resin (IV) include polyolefin resins such as polyethylene resin and polypropylene resin, polyvinyl alcohol resin, polyvinylidene chloride resin, polyester resin, polyamide resin, polyacetal resin, polyether ether ketone resin, polyetherketone resin, polyketone resin, polyimide resin, and copolymers thereof, which may be used alone or in combination of two or more. Of these, the preferred are the polyamide resin and the polyester resin in view of the heat resistance, the workability in the molding, the flowability, and the mechanical properties.

The polyamide resin as mentioned above is a polyamide resin having a melting point and exhibiting excellent heat resistance and strength, and examples include ring-opening polymerization products of cyclic lactam, polycondensates of aminocarboxylic acid, and polycondensates of dibasic acid and diamine. More specific examples include aliphatic polyamides such as nylon 6, nylon 66, nylon 46, nylon 56, nylon 610, nylon 612, nylon 11, and nylon 12, aliphatic-aromatic polyamides having a melting point such as poly (m-xylene adipamide), poly(hexamethylene terephthalamide), poly(hexamethylene isophthalamide), poly (nonamethylene terephthalamide), and poly(tetramethylene isophthalamide), and copolymers and mixtures thereof as long as the melting point is present. Of these, the preferred are nylon 6 and nylon 610, and the most preferred is nylon 6 in view of the balance of the mechanical properties, the heat resistance, and the flowability, the stability in retention during the molding, and the appearance of the molded article which are the merits of the present invention.

The polyester resin as mentioned above is a polyester resin having a melting point, and examples include crystalline polyester resins produced from a polycondensate of dicarboxylic acid and glycol, a ring-opening polymerization product of cyclic lactone, a polycondensate of hydroxycarboxylic acid, and a polycondensates of dibasic acid and glycol. More specific examples include semi-aromatic polyesters such as polyethylene terephthalate, polypropylene terephthalate, polybuthylene terephthalate, polyethylene naphthalate, polybutylene naphthalate, polycyclohexane dimethylene terephthalate, and polyethylene-1,2-bis(phenoxy)ethane-4,4'-dicarboxylate, semi-aromatic polyester having a melting point such as polyethylene-1,2-bis(phenoxy)ethane-4,4'-dicarboxylate/isophthalate copolymer, polybuthylene terephthalate/decane dicarboxylate copolymer, and polycyclohexane dimethylene terephthalate/isophthalate copolymer, and crystalline polyesters comprising a mixture thereof as long as the melting point is present. A crystalline polyester resin exhibiting thermotropic liquid Crystallinity comprising a structural unit selected from aromatic oxycarbonyl unit, aromatic dioxy unit, aromatic dicarbonyl unit, aromatic aminoxy unit, and ethylene oxide unit is also usable.

Examples of the aromatic oxycarbonyl unit as mentioned above include structural units generated from p-hydroxybenzoic acid 6-hydroxy-2-naphthoic acid and 4'-hydroxydiphenyl-4-carboxylic acid, and examples of the aromatic dioxy unit include structural units generated from 4,4'-dihydroxybiphenyl, hydroquinone, and t-butylhydroquinone. Exemplary aromatic dicarbonyl units include structural units generated from terephthalic acid, isophthalic acid, and 2,6-naphthalene dicarboxylic acid, and exemplary aromatic aminoxy units include structural units generated from 4-aminophenol.

Other polyesters that can be used include aliphatic polyesters such as a polylactic acid prepared by using lactic acid and/or lactide for the main material and copolymers thereof as long as the melting point is present.

The crystalline polyester which is particularly preferable for the present invention is preferably a semi-aromatic polyester such as polyethylene terephthalate resin, polypropylene terephthalate resin, polybuthylene terephthalate resin, polyethylene naphthalate resin, and copolymers and mixtures thereof as long as they have a melting point. The more preferred are polyethylene terephthalate resin and polybuthylene terephthalate resin, and the most preferred is polybuthylene terephthalate resin.

Such polyester is not particularly limited for its molecular weight, and those having an intrinsic viscosity as typically measured by using a 1:1 mixed solvent of phenol/tetrachloroethane at 25° C. of 0.10 to 3.00 dl/g can be used. The polyesters used are preferably those having an intrinsic viscosity of 0.25 to 2.50 dl/g, and most preferably those having an intrinsic viscosity of 0.40 to 2.25 dl/g.

In the thermoplastic resin composition of the present invention, content of the crystalline resin (IV) is in the range of 1 to 9% by weight, preferably 2 to 8% by weight, and more preferably 3 to 7% by weight when the total content of the polycarbonate resin (I), the graft copolymer (II), the vinyl copolymer (III), the crystalline resin (IV), and the inorganic filler (V) is 100% by weight. Amount of the crystalline resin (IV) of less than 1% by weight is unpreferable since stability in retention during the molding is likely to be poor and the molded article will have poor appearance while the amount in excess of 9% by weight is also unpreferable since the heat resistance is likely to be poor.

The thermoplastic resin composition of the present invention may also contain a phosphorus compound. When the phosphorus compound is present, transesterification between the polycarbonate resin (I) and the polyester resins which is a typical example of the crystalline resin (IV) during the melt kneading and the melt molding will be effectively suppressed and the problem of foaming will also be solved. Accordingly, molding properties such as thermal stability in the melt molding will also be improved.

Examples of the phosphorus compound which may be used in the present invention include phosphite ester, phosphate ester, and condensed phosphate ester, and of these, the preferred are phosphate ester and condensed phosphate ester, which may be used alone or in combination of two or more.

The plate-shaped inorganic filler (V) of the thermoplastic resin composition of the present invention is not particularly limited as long as it has plate-shaped morphology. Examples include glass flake, mica, talc, alumina flake, kaolin, carbon flake, metal flake, flake carbon, graphite, and clay, and examples of the metal flake include the flake of silver, nickel, copper, zinc, aluminum, stainless steel, iron, brass, chromium, and tin. These fillers may be used in combination of two or more. Of these, the most preferred is talc in view of the size stability and mechanical properties.

When the plate-shaped inorganic filler (V) is talc, the talc may preferably have an average particle size of 1.0 to 10.0 μm, more preferably 2.0 to 7.0 μm, and still more preferably 3.0 to 5.0 μm in view of the high balance of the mechanical properties, the size stability, the stability in retention, and the appearance of the molded article. When the average particle size is at least 1.0 μm, the stability in retention will be improved and the molded article is likely to have an improved appearance. The average particle size is preferably up to 5.0 μm in view of improving the mechanical properties and the size stability.

The plate-shaped inorganic filler (V) may be the one which has been subjected to a surface treatment by a coupling agent such as an isocyanate compound, organic silane compound, organic titanate compound, organoborane compound, or epoxy compound.

In the thermoplastic resin composition of the present invention, content of the plate-shaped inorganic filler (V) is typically in the range of 10 to 20% by weight, preferably 11 to 19% by weight, and more preferably 12 to 18% by weight in relation to 100% by weight of the total of the polycarbonate resin (I), the graft copolymer (II), the vinyl copolymer (III), the crystalline resin (IV), and the inorganic filler (V). When the amount of the plate-shaped inorganic filler (V) added is less than 10% by weight, the mechanical properties and the size stability are likely to be insufficient. In the meanwhile, amount of the plate-shaped inorganic filler (V) in excess of 20% by weight is also unpreferable since such content is likely to invite insufficiency of the stability in retention, and hence, poor appearance of the molded article.

In the thermoplastic resin composition of the present invention, content of the crystalline resin (IV) in relation to 100% by weight of the plate-shaped inorganic filler (V) is at least 10% by weight and less than 50% by weight. When the content of the crystalline resin (IV) in relation to 100% by weight of the plate-shaped inorganic filler (V) is at least 10% by weight, decrease of the stability in retention of the thermoplastic resin composition can be suppressed to improve the appearance of the molded article, and bubbling in the coating can also be suppressed. The content of the crystalline resin (IV) in relation to the inorganic filler (V) is preferably at least 15% by weight and more preferably at least 20% by weight. When the content of the crystalline resin (IV) in relation to 100% by weight of the plate-shaped inorganic filler (V) is less than 50% by weight, decrease in the stability in retention will be suppressed, and the heat resistance will be retained at a sufficient level. The content of the crystalline resin (IV) in relation to the inorganic filler (V) is preferably up to 45% by weight and more preferably up to 40% by weight.

In the thermoplastic resin composition of the present invention, temperature of exothermic peak corresponding to crystallization of the crystalline resin (IV) expressed in the temperature descending stage in differential scanning calorimetry is preferably at least 185° C., more preferably at least 187° C., and still more preferably at least 190° C. The temperature of exothermic peak corresponding to crystallization of the crystalline resin (IV) tends to increase by the incorporation of the plate-shaped inorganic filler (V) in the crystalline resin (IV) and the temperature of exothermic peak corresponding to crystallization of the crystalline resin (IV) of at least 185° C. is preferable in view of the excellent balance of the mechanical properties, the heat resistance, the flowability, and the size stability as well as the improved stability in retention and appearance of the molded article. It is to be noted that, in the present invention, the temperature of exothermic peak corresponding to crystallization of the crystalline resin (IV) is the temperature of the exothermic peak observed in the second temperature descending stage (Tc2) during the observation under the following conditions when 10 mg of the pellets of the thermoplastic resin composition was evaluated by the differential scanning calorimetry using "DSC-60" manufactured by Shimadzu Corporation.

(1) temperature elevation from 40° C. to 300° C. at a temperature elevation condition of 20° C./minute (first temperature elevation)
(2) temperature retention at 300° C. for 1 minute
(3) temperature descending from 300° C. to 40° C. at a temperature descending condition of 20° C./minute (first temperature descending)
(4) temperature retention at 40° C. for 1 minute
(5) temperature elevation from 40° C. to 300° C. at a temperature elevation condition of 20° C./minute (second temperature elevation)
(6) temperature retention at 300° C. for 1 minute
(7) temperature descending from 300° C. to 40° C. at a temperature descending condition of 20° C./minute (second temperature descending)

In addition, an impact resistance-modifying agent known in the art may also be used to the extent not adversely affecting the properties of the present invention. Exemplary impact resistance-modifying agents that can be used include natural rubber, polyethylenes such as low density polyethylene and high density polyethylene, polypropylene, ethylene elastomers such as ethylene/propylene copolymer, ethylene/methyl acrylate copolymer, ethylene/ethyl acrylate copolymer, ethylene/vinyl acetate copolymer, ethylene/glycidyl methacrylate copolymer, ethylene/butyl acrylate copolymer, ethylene/ethyl acrylate/carbon monoxide copolymer, ethylene/glycidyl methacrylate copolymer, ethylene/methyl acrylate/glycidyl methacrylate copolymer, ethylene/butyl acrylate/glycidyl methacrylate copolymer, ethylene/octene-1 copolymer, and ethylene/butene-1 copolymer, polyester elastomers such as polyethylene terephthalate/poly (tetramethylene oxide)glycol block copolymer, polyethylene terephthalate/isophthalate/poly(tetramethylene oxide) glycol block copolymer, core-shell elastomers of MBS or acryl, and styrene elastomers, which may not be necessary used alone and which may be used in combination of two or more.

Furthermore, an inorganic filler other than the plate-shaped inorganic filler (V) may be added to the extent not adversely affecting the properties of the present invention. A preferable type of the inorganic filler other than the plate-shaped inorganic filler (V) is glass fiber, and the morphology of such inorganic filler may be any morphology such as fiber, powder, and particles. Examples include PAN and pitch carbon fibers, metal fibers such as stainless steel fiber, aluminum fiber, and brass fiber, organic fibers such as aromatic polyamide fiber, fiber and whisker fillers such as gypsum fiber, ceramic fiber, asbestos fiber, zirconia fiber, alumina fiber, silica fiber, titanium oxide fiber, silicon carbide fiber, glass fiber, rock wool, potassium titanate whisker, barium titanate whisker, aluminum borate whisker, and silicon nitride whisker, and powder and particle fillers such as silica, calcium carbonate, glass beads, glass microballoon, clay, molybdenum disulfide, wollastonite, montmorillonite, titanium oxide, zinc oxide, barium sulfate, calcium polyphosphate, and graphite. The type of the glass fiber used is not particularly limited as long as the glass fiber is the one used in the reinforcement of a resin, and the glass fiber may be used by adequately selecting from long-fiber and short-fiber chopped strands, milled fibers, and the like. The inorganic fillers as described above may also be used after treating their surface with a known coupling agent (for example, a silane coupling agent or a titanate coupling agent) or other surface treating agent. The glass fiber may be coated or bundled with a thermoplastic resin such as ethylene/vinyl acetate copolymer or a thermosetting resin such as epoxy resin. The inorganic filler may also be coated or bundled with a thermoplastic resin such as ethylene/vinyl acetate copolymer or a thermosetting resin such as epoxy resin, or treated with a coupling agent such as aminosilane or epoxysilane.

Furthermore, a known matting agent may be added to the extent not adversely affecting the properties of the present invention. Examples of the matting agent that can be used include unsaturated nitrile-conjugated diene copolymer rubbers such as acrylonitrile-butadiene copolymer rubber, acrylonitrile-isoprene copolymer rubber, acrylonitrile-butadiene-isoprene copolymer rubber, and acrylonitrile-butadiene-acrylic acid copolymer rubber as well as rubbers wherein the conjugated diene unit in these rubbers has been hydrogenated. Another rubber may be used with the unsaturated nitrile-conjugated diene copolymer rubber, and exemplary such rubbers are rubbers which can be cross-linked by using a crosslinking agent of sulfur vulcanization or organic peroxide vulcanization type commonly used in the rubber industry. Examples of such rubber include conjugated diene polymer rubbers such as polybutadiene rubber, styrene-butadiene copolymer rubber (random, block), natural rubber, polyisoprene rubber, polychloroprene rubber, and hydrides thereof, and EPDM.

Furthermore, other components may be optionally added to the extent not adversely affecting the properties of the Present invention, and exemplary such components include agents for preventing thermal oxidation such as hindered phenol antioxidant, sulfur-containing compound antioxidant, phosphorus-containing organic compound antioxidant, phenol antioxidant, and acrylate antioxidant, UV absorbents such as benzotriazole UV absorbent, benzophenone UV absorbent, and succinate UV absorbent, molding aid such as a polymer or copolymer comprising acrylic acid and its ester and methacrylic acid and its ester other than the graft copolymer (II-2) and modified polytetrafluoroethylene, flame retardants and flame retardant aids such as decabromobiphenyl ether, tetrabromobisphenol A, chlorinated polyethylene, brominated epoxy oligomer, brominated polycarbonate, antimony trioxide, and condensed phosphate, antimicrobial agent as typically represented by silver antimicrobial agents, antimold agent, carbon black, titanium oxide, mold release agent, lubricant, pigment, and dye.

The thermoplastic resin composition of the present invention can be obtained by melt kneading these resin components. The method used for the melt kneading is not particularly limited, and exemplary methods include those wherein the melt kneading is conducted by a single or twin-screw in a vented cylinder having a heater. The temperature in the melt kneading is typically selected from the range of 230 to 320° C., and the temperature gradient may be freely set in the range not adversely affecting the merits of the present invention. When a twin screw is used, the rotational direction may be the same or different and the screws may be either intermeshed or non-intermeshed screws.

The method used for molding the thermoplastic resin composition of the present invention is not particularly limited, and use of injection molding is preferable. The injection molding may be conducted in the temperature range typically used in the molding of a thermoplastic resin which is preferably in the range of 240 to 300° C. The preferable mold temperature used in the injection molding is the temperature typically used in the molding which is preferably in the range of 30 to 80° C.

The thermoplastic resin composition of the present invention exhibits good balance between mechanical properties, heat resistance, flowability, and size stability as well as excellent stability in retention in the molding, appearance of the molded article, and coating properties. The thermoplastic resin composition containing the graft copolymer (II-2) also exhibits excellent weatherability in addition to the properties as described above. Accordingly, the thermoplastic resin composition of the present invention is suitable for producing molded articles having a large size or a complicated shape. More specifically, the resin composition of the present invention is preferable for use in automobile interior parts such as power window panel, center console, center cluster, console shutter, lever controller, and console box, and also, for the application which have not been previously discussed such as automobile exterior parts, namely, rear spoiler, grill, garnish, door mirror, roof, fender, bumper, and the like. Also preferable are applications such as electric and electronic applications, OA appliance, and building and construction materials.

EXAMPLES

The present invention is described in further detail by referring to the following Examples which by no means limit the scope of the present invention and various modifications may be conducted. First, the evaluation methods used in the Reference Example, Examples, and Comparative Examples are as described below.

(1) Graft Rate 200 ml acetone was added to a predetermined amount (m; about 1 g) of the diene graft copolymer (II-1) or (II-2) prepared as described below, and the solution was refluxed in a hot water bath at a temperature of 70° C. for 3 hours. This solution was centrifuged at 8800 r.p.m. (10000 G) for 40 minutes, and the insoluble content was separated by filtration. This insoluble content in the acetone was dried at a reduced pressure at 60° C. for 5 hours, and its weight (n; unit, g) was measured. The graft rate was calculated by the following equation:

$$\text{Graft rate (\% by weight)} = \{[(n)-\{(m) \times L\}]/[(m) \times L]\} \times 100$$

wherein L represents rubber content of the graft copolymer (a real number in excess of 0 and less than 1).

(2) Intrinsic Viscosity

The viscosity of the vinyl copolymer (III-1) produced by the procedure as described below was measured by using a solution of this vinyl copolymer (III-1) in methyl ethyl ketone at a concentration of 0.2 g/dl and 0.4 g/dl at a measurement temperature of 30° C. by using Ubbelohde viscometer to thereby calculate the intrinsic viscosity.

(3) Exothermic Peak Temperature

The temperature of the exothermic peak corresponding to the crystallization of the crystalline resin (IV) was measured by using the thermoplastic resin composition obtained in each Example and Comparative Example. By using 10 mg of the pellets of thermoplastic resin composition for the differential scanning calorimetry using "DSC-60" manufactured by Shimadzu Corporation, temperature of the exothermic peak observed in the second temperature descending stage (Tc2) during the observation under the following conditions was measured.

(a) temperature elevation from 40° C. to 300° C. at a temperature elevation condition of 20° C./minute (first temperature elevation)

(b) temperature retention at 300° C. for 1 minute (c) temperature descending from 300° C. to 40° C. at a temperature descending condition of 20° C./minute (first temperature descending)

(d) temperature retention at 40° C. for 1 minute (e) temperature elevation from 40° C. to 300° C. at a temperature elevation condition of 20° C./minute (second temperature elevation)

(f) temperature retention at 300° C. for 1 minute (g) temperature descending from 300° C. to 40° C. at a temperature descending condition of 20° C./minute (second temperature descending)

(4) Impact Resistance

Charpy impact strength was measured according to ISO 179/1eA. More specifically, the multipurpose test specimen type A1 defined in JIS K 7139 was molded from the pellets produced in the Examples and Comparative Examples by using the injection molding machine at a cylinder temperature of 250° C. and a mold temperature of 60° C., and test specimen type B2 was cut out from the test specimen type A1 for use in the measurement of the Charpy impact strength.

(5) Flowability

Melt flow rate of the pellets produced in the Examples and Comparative Examples was measured by using the procedure of ISO 1133 under the conditions including the temperature of 240° C. and the load of 98 N.

(6) Heat Resistance

The measurement was conducted according to the measurement procedure of heat distortion temperature of ISO 75-2 (in the condition of 1.8 MPa). The test piece was produced by molding the multipurpose test specimen type A1 defined in JIS K 7139 by using the injection molding machine at a cylinder temperature of 250° C. and a mold temperature of 60° C.

(7) Rigidity

The measurement was conducted according to the measurement procedure of flexural modulus of ISO 178. The test piece was produced by molding the multipurpose test specimen type A1 defined in JIS K 7139 by using the injection molding machine at a cylinder temperature of 250° C. and a mold temperature of 60° C.

(8) Size Stability

The measurement was conducted according to the method for testing coefficient of linear expansion of JIS K 7197 by Using a test piece which had been annealed at 80° C. for 16 hours, and measuring the coefficient of linear expansion (unit, $K^{-1}$) in the direction of the resin flow (MD) in the injection molding and its transverse direction (TD) at −30° C. to 80° C.

(9) Stability in Retention During the Molding (Surface Appearance of the Molded Article)

Figure 1B:
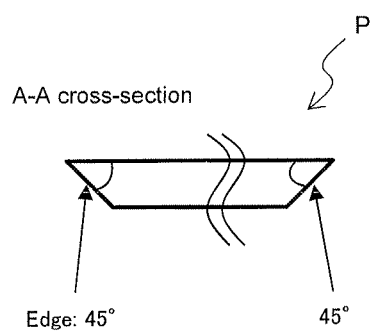
FIG. 1(b) is across-sectional view seen in lines A-A of FIG. 1 (a).

A rectangular plate P with a width of 70 mm, a length of 150 mm, and a thickness of 3 mm having the longitudinal edges cut at an angle of 45° as schematically shown in FIGS. 1 (a) and (b) (FIG. 1 (a) is plan view of the rectangular plate P, and FIG. 1 (b) is cross-sectional view of the rectangular plate P taken along lines A-A; position of the gate in the injection molding indicated by an open arrow) was produced by using an injection molding machine with the cylinder temperature set at 290° C. and the mold temperature set at 10° C. Most of the resulting molded article exhibited good stability in retention during the molding, and their appearance was excellent. Visual evaluation was conducted by the following criteria. The grades 3 to 5 were evaluated "pass" and the grades 1 and 2 were evaluated "fail."

5: No silver streak

4: Failure in the appearance (silver streaks) is found at less than 10 locations, and the problem is not serious 3: Failure in the appearance (silver streaks) is found at at least 10 and less than 30 locations, and the problem is not serious 2: Generation of silver streaks is prominent near the gate with the problem in the appearance 1: Silver streaks are found all over the molded article with the problem in the appearance.

(10) Coating Property (Bubbling in the Coated Molded Articles Having Edges)

The molded article obtained in the above (9) was coated with an acryl-urethane two-part coating solution (Retan PG60/hardener manufactured by KANSAI PAINT CO., LTD.) by using a coating robot system (KE610H manufactured by Kawasaki Heavy Industries, Ltd. and Cartridge Bell manufactured by ABB) to a coating thickness of 30 μm, and dried at a drying temperature of 80° C. for 30 minutes to obtain the coated molded article. Opposite edges of the resulting coated molded article were observed and presence of the bubbling in the coating was evaluated by the following criteria. A and B were evaluated "pass" and C and D were evaluated "fail".

A: Good appearance with no bubbling found along opposite edges

B: Bubbling along opposite edges is found at up to 10 locations, and the problem is not serious C: Bubbling is prominent along opposite edges causing problems in the appearance D: Bubbling is found along opposite edges and all over the molded article

(11) Evaluation of Weatherability 0.6 wt % of carbon black was added to pellets obtained in Examples 21 to 41 and Comparative Examples 13 to 24 and the pellets were colored black in a single screw extruder, and a rectangular plate test piece having a thickness of 3 mm was prepared by using an injection molding machine with the cylinder temperature set at 250° C. and the mold temperature set at 60° C. A weatherability test of UV (wavelength, 300 to 400 nm) irradiation was conducted for 2000 hours by using Sunshine Weather Meter (model WEL-SUN-HCH manufactured by Suga Test Instruments Co., Ltd.) under the conditions including the black panel temperature of 63° C., cycle of 60 minutes (rain, 12 minutes), and irradiance of 80 $W/m^2$ to measure color difference (ΔE) before and after the weatherability test.

<Polycarbonate Resin (I)>

Polycarbonate resin (I-1): product name "Iupilon (Registered Trademark) H-4000" having a viscosity average molecular weight of 15,000 manufactured by Mitsubishi Engineering-Plastics Corporation Polycarbonate resin (I-2): product name "Iupilon (Registered Trademark) H-3000" having a viscosity average molecular weight of 18,000 manufactured by Mitsubishi Engineering-Plastics Corporation Polycarbonate resin (I-3): product name "Iupilon (Registered Trademark) S-3000" having a viscosity average molecular weight of 21,500 manufactured by Mitsubishi Engineering-Plastics Corporation Polycarbonate resin (I-4): product name "Iupilon (Registered Trademark) S-2000" having a viscosity average molecular weight of 24,000 manufactured by Mitsubishi Engineering-Plastics Corporation <Preparation of Graft Copolymer (II-1)>

By using potassium stearate, a monomer mixture comprising 40% by weight of styrene and 15% by weight of acrylonitrile was subjected to emulsion polymerization in the presence of 45% by weight (in terms of solid content) of polybutadiene latex (two types each having a weight average particle diameter of 350 nm and 800 nm were used at a ratio of 8:2; diene rubbery polymer (A1)) to produce a rubber-modified styrene-acrylonitrile copolymer latex. After aggregating this latex by adding to 0.3% aqueous solution of dilute sulfuric acid at a temperature of 90° C. and neutralizing by aqueous sodium hydroxide, the steps of washing, water removal, and drying were conducted to prepare graft copolymer (II-1). The graft rate was 25%.

<Preparation of Graft Copolymer (II-2)>

[Process of Producing Acryl Rubbery Polymer (A2)]

130 parts by weight of pure water and 1 part by weight (in terms of solid content) of aqueous solution of disproportionated potassium rosinate (emulsifier) were charged in a reaction vessel, and the temperature was raised to 75° C. With stirring, a mixture (mixture 1) of 19.8 parts by weight of n-butyl acrylate and 0.2 part by weight of allyl methacrylate was continuously added for 1 hour (first addition step). Subsequently, each of 8 parts by weight of 2% by weight aqueous solution of potassium persulfate and 1.5 parts by weight (in terms of solid content) of aqueous solution of disproportionated potassium rosinate was continuously added for 6 hours (second addition step). 2 hours after the addition of the aqueous solution of potassium persulfate and the aqueous solution of disproportionated potassium rosinate, a mixture (mixture 3) of 79.2 parts by weight of n-butyl acrylate and 0.8 part by weight of allyl methacrylate was added for 4 hours (third addition step). After the completion of the addition, the solution was retained for another 1 hour to obtain acryl rubbery polymer (A2) latex at a polymerization rate of 95%.

[Process of Producing Graft Copolymer]

Subsequently, a mixture of 13.2 parts by weight of pure water, 0.48 parts by weight of glucose anhydride, 0.26 parts by weight of sodium pyrophosphate, and 0.01 part by weight of ferrous sulfate, a mixture of 0.4 part by weight of potassium oleate and 12.5 parts by weight of pure water, 50 parts by weight (in terms of solid content) of acryl rubbery polymer (A2), and 94.3 parts by weight of pure water were charged in a reaction vessel, and the temperature was raised to 58° C. With stirring, a mixture (i) of 36.5 parts by weight of styrene, 13.5 parts by weight of acrylonitrile, and 0.2 part by weight of t-dodecyl mercaptan was continuously added for 4 hours. At 0.5 hour after the start of the continuous addition, the temperature in the vessel was raised to 62° C., and a mixture of 0.3 part by weight of cumene hydroperoxide, 2.0 parts by weight of potassium oleate, and 12.5 parts by weight of pure water were continuously added for 5 hours in parallel. At the completion of the addition of the mixture (i), the temperature was further raised to 65° C. to obtain the graft copolymer latex at a polymerization rate of 98%. 100 parts by weight (in terms of solid content) of the resulting latex was poured with stirring into 900 parts by weight of water at 85° C. having 3 parts by weight of magnesium sulfate added thereto for aggregation, and water removal and drying were conducted to obtain powdery graft copolymer (II-2). The graft rate was 30%.

<Preparation of Vinyl Copolymer (III)>

A slurry was produced by suspension polymerization of a monomer mixture comprising 76% by weight of styrene and 24% by weight of acrylonitrile, and the slurry was subjected to the steps of washing, water removal, and drying to prepare vinyl copolymer (III-1). The resulting vinyl copolymer (III-1) had an intrinsic viscosity of 0.42 dl/g.

<Crystalline Resin (IV)>

Polybuthylene terephthalate resin (IV-1): product name "TORAYCON 1100M" manufactured by Toray Industries, Inc. having a melting point (endothermic peak temperature, Tm2) of 224° C.

Polyamide resin (IV-2): product name "AMILAN CM1001" manufactured by Toray Industries, Inc. having a melting point (endothermic peak temperature, Tm2) of 225° C.

Polyethylene terephthalate resin (IV-3):
manufactured by Toray Industries, Inc. having a melting point (endothermic peak temperature, Tm2) of 258° C. and an intrinsic viscosity of 0.654

<Inorganic Filler (V)>

Talc (V-1): product name "Micron White 5000S" manufactured by Hayashi Kasei Co., Ltd. having an average particle diameter of 4.8 μm Kaolin (V-2): product name "Hydrite RS" manufactured by IMERYS Minerals Japan having an average particle diameter of 0.77 μm Sintered kaolin (V-3): product name "PoLester 200R" manufactured by IMERYS Minerals Japan having an average particle diameter of 2.0 μm Wollastonite (V-4): product name "NYGLOS 4W 10992" manufactured by IMERYS Specialities Japan having an average fiber length of 63 μm <Other Additives>

Modified polytetrafluoroethylene: product name "METABLEN A3800 manufactured by Mitsubishi Rayon Co., Ltd.

Phosphorus-based thermal stabilizer: product name "ADEKA STAB 135A" manufactured by ADEKA Acidic compound: 0.5 mol/L phosphoric acid Organophosphate compound: product name "ADEKA STAB AX-71" manufactured by ADEKA Examples 1 to 41 and Comparative Examples 1 to 24

The polycarbonate resin (I), the graft copolymer (II), the vinyl copolymer (III), the crystalline resin (IV), and the inorganic filler (V) were blended in the ratio shown in Tables 1 to 6, and melt kneading was conducted by using a twin screw extruder (temperature range, 240 to 260° C.) having screws with a screw diameter of 30 mm rotating in the same direction to produce pellets. By using pellets, test pieces were prepared by using an injection molding machine (molding temperature 250° C., mold temperature 60° C.) to conduct the evaluation by the procedure as described above. The molded article for confirming the surface appearance of (9) was prepared by the conditions described in (9). The results of the Examples are shown in Tables 1, 2, 4, 5, and 6, and the results of the Comparative Examples are shown in Tables 3 and 6.

Examples 1 to 20 and 41, namely, the thermoplastic resin composition containing the graft copolymer (II-1) exhibits excellent balance of the mechanical properties, the heat resistance, the flowability, and the size stability as well as good stability in retention during the molding, good appearance of the molded article, and excellent coating properties. In the meanwhile, comparison between Examples 1 to 4 and Comparative Examples 1 and 2 reveals that, the content of the polycarbonate resin (I) less than the scope defined in the present invention results in the insufficient impact resistance and heat resistance while excessive content results in the poor surface appearance and coating properties. Comparison between Examples 2, 5, and 6 and Comparative Examples 3 and 4 reveals that the content of the graft copolymer (II-1) less than the scope defined in the present invention results in the insufficient impact resistance and coating properties while excessive content results in the insufficient heat resistance and rigidity. Comparison between Examples 2 and 7 to 10 and Comparative Examples 5 to 10 reveals that the content of the crystalline resin (IV) in relation to 100% by weight of the inorganic filler (V) less than the scope defined by the present invention results in the insufficient surface appearance and coating properties while excessive content results in the insufficient heat resistance. Comparison between Example 2 and Comparative Examples 11 to 12 reveals that the content of the inorganic filler (V) less than the scope defined in the present invention results in the insufficient rigidity and size stability while excessive content results in the insufficient stability in retention associated with poor appearance of the molded article and poor coating properties.

Examples 21 to 40, namely, the thermoplastic resin composition containing the graft copolymer (II-2) exhibits excellent balance of the mechanical properties, the heat resistance, the flowability, and the size stability as well as good stability in retention during the molding, excellent molded article appearance, good coating properties, and sufficient weatherability. In the meanwhile, comparison between Examples 21 to 24 and Comparative Examples 13 and 14 reveals that the content of the polycarbonate resin (I) less than the scope defined in the present invention results in the insufficient impact resistance and heat resistance while excessive content results in the poor surface appearance and coating properties. Comparison between Examples 22, 25, and 26 and Comparative Examples 15 and 16 reveals that the content of the graft copolymer (II-2) less than the scope defined in the present invention results in the insufficient impact resistance and coating properties while excessive Content results in the insufficient heat resistance and rigidity.

Comparison between Examples 22 and 27 to 30 and Comparative Examples 17 to 22 reveals that the content of the crystalline resin (IV) in relation to 100% by weight of the inorganic filler (V) less than the scope defined in the present invention results in the insufficient surface appearance and coating properties while excessive content results in the poor heat resistance. Comparison between Examples 22 and 28 and Comparative Examples 23 to 24 reveals that the content of the inorganic filler (V) less than the scope defined in the present invention results in the insufficient rigidity and size stability and excessive content results in the insufficient stability in retention associated with poor appearance of the molded article and poor coating properties. Comparison of Example 22 and Example 41 reveal that the thermoplastic resin composition constituted from the graft copolymer (II-2) comprising the acryl rubbery polymer (A2) is superior to the thermoplastic resin composition constituted from the graft copolymer (II-1) comprising the diene rubbery polymer (A1) in the weatherability.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Polycarbonate resin (I) | I-1 (wt %) | | | | | | | | | | |
|  | I-2 (wt %) | 50 | 55 | 65 | 70 | 55 | 55 | 55 | 55 | 55 | 55 |
|  | I-3 (wt %) | | | | | | | | | | |
|  | I-4 (wt %) | | | | | | | | | | |
| Graft copolymer (II) | II-1 (wt %) | 7 | 7 | 4 | 4 | 3 | 14 | 7 | 7 | 7 | 7 |
| Vinyl copolymer (III) | III-1 (wt %) | 22 | 17 | 10 | 10 | 21 | 10 | 14.8 | 16 | 18 | 16 |
| Crystalline resin (IV) | IV-1 (wt %) | 5 | 5 | 5 | 4 | 5 | 5 | 7.2 | 6 | 4 | 2 |
|  | IV-2 (wt %) | | | | | | | | | | |
| Inorganic filler (V) | V-1 (wt %) | 16 | 16 | 16 | 12 | 16 | 16 | 16 | 16 | 16 | 20 |
|  | V-2 (wt %) | | | | | | | | | | |
|  | V-3 (wt %) | | | | | | | | | | |
| Other additives | Modified polytetra-fluoroethylene (wt %) | 1 | 1 | 1 | 1 | 1 | 1 | 1 | 1 | 1 | 1 |
|  | Phosphorus-based thermal stabilizer (wt %) | 0.1 | 0.1 | 0.1 | 0.1 | 0.1 | 0.1 | 0.1 | 0.1 | 0.1 | 0.1 |
|  | Acidic compound (wt %) | 0.3 | 0.3 | 0.3 | 0.3 | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 | 0.1 | 0.1 | 0.1 | 0.1 |
| Content of (IV) in relation to 100 wt % of (V) |  | 31 | 31 | 31 | 33 | 31 | 31 | 45 | 38 | 25 | 10 |
| Temperature of exothermic peak | °C. | 196 | 196 | 195 | 197 | 196 | 196 | 198 | 197 | 194 | 187 |
| Charpy impact strength | kJ/m$^2$ | 6 | 6 | 8 | 9 | 5 | 13 | 6 | 6 | 7 | 6 |
| MFR (240° C. × 98N) | g/10 min | 39 | 36 | 31 | 31 | 41 | 30 | 37 | 37 | 38 | 34 |
| Heat distortion temperature (1.82 MPa) | °C. | 104 | 108 | 114 | 114 | 110 | 104 | 104 | 106 | 110 | 112 |
| Flexural modulus | MPa | 3880 | 3920 | 4080 | 3830 | 4110 | 3390 | 3880 | 3900 | 3910 | 4170 |
| Coefficient of linear expansion | MD (×10$^{-5}$/K) | 4.9 | 4.9 | 4.7 | 5.2 | 4.4 | 5.4 | 5.1 | 5.0 | 4.8 | 4.3 |
|  | TD (×10$^{-5}$/K) | 6.6 | 6.5 | 6.4 | 6.8 | 6.2 | 6.8 | 6.6 | 6.6 | 6.7 | 6.0 |
| Appearance | 1 (poor) to 5 (good) | 5 | 5 | 5 | 5 | 5 | 5 | 5 | 5 | 4 | 3 |
| Bubbling of the coating | — | A | A | B | B | B | A | A | A | B | B |

TABLE 2

|  |  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| Polycarbonate resin (I) | I-1 (wt %) | 55 | | | | | | | | | |
|  | I-2 (wt %) | | 40 | 25 | | | 55 | 55 | 55 | 55 | 55 |
|  | I-3 (wt %) | | 15 | 30 | 55 | | | | | | |
|  | I-4 (wt %) | | | | | 55 | | | | | |
| Graft copolymer (II) | II-1 (wt %) | 7 | 7 | 7 | 7 | 7 | 7 | 7 | 7 | 7 | 7 |
| Vinyl copolymer (III) | III-1 (wt %) | 17 | 17 | 17 | 17 | 17 | 17 | 17 | 17 | 17 | 17 |
| Crystalline resin (IV) | IV-1 (wt %) | 5 | 5 | 5 | 5 | 5 | | 5 | 5 | 5 | |
|  | IV-2 (wt %) | | | | | | 5 | | | | |
|  | IV-3 (wt %) | | | | | | | | | | 5 |
| Inorganic filler (V) | V-1 (wt %) | 16 | 16 | 16 | 16 | 16 | 16 | | | 8 | 16 |
|  | V-2 (wt %) | | | | | | | 16 | | | |
|  | V-3 (wt %) | | | | | | | | 16 | | |
|  | V-4 (wt %) | | | | | | | | | 8 | |
| Other additives | Modified polytetra-fluoroethylene (wt %) | 1 | 1 | 1 | 1 | 1 | 1 | 1 | 1 | 1 | 1 |
|  | Phosphorus-based thermal stabilizer (wt %) | 0.1 | 0.1 | 0.1 | 0.1 | 0.1 | 0.1 | 0.1 | 0.1 | 0.1 | 0.1 |
|  | Acidic compound (wt %) | 0.3 | 0.3 | 0.3 | 0.3 | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 | 0.1 | 0.1 | 0.1 | 0.1 |
| Content of (IV) in relation to 100 wt % of (V) |  | 31 | 31 | 31 | 31 | 31 | 31 | 31 | 31 | 31 | 31 |
| Temperature of exothermic peak | °C. | 196 | 196 | 196 | 196 | 196 | 196 | 196 | 196 | 196 | 219 |
| Charpy impact strength | kJ/m$^2$ | 5 | 6 | 7 | 8 | 11 | 7 | 8 | 6 | 6 | 6 |
| MFR (240° C. × 98N) | g/10 min | 55 | 32 | 29 | 25 | 17 | 37 | 36 | 38 | 41 | 20 |

TABLE 2-continued

|  |  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| Heat distortion temperature (1.82 MPa) | ° C. | 107 | 108 | 108 | 109 | 110 | 109 | 106 | 106 | 107 | 115 |
| Flexural modulus | MPa | 3930 | 3890 | 3890 | 3840 | 3860 | 3950 | 3800 | 3520 | 4100 | 4050 |
| Coefficient of linear expansion | MD | 4.9 | 4.8 | 4.8 | 4.7 | 4.7 | 5.0 | 5.6 | 5.7 | 4.4 | 4.8 |
|  | TD | 6.5 | 6.5 | 6.4 | 6.4 | 6.4 | 6.7 | 6.8 | 6.9 | 6.9 | 6.4 |
| Appearance | 1 (poor) to 5 (good) | 5 | 5 | 5 | 3 | 3 | 5 | 4 | 5 | 5 | 5 |
| Bubbling of the coating | — | A | A | A | A | A | A | A | A | A | A |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Polycarbonate resin (I) | I-1 (wt %) |  |  |  |  |  |  |  |
|  | I-2 (wt %) | 40 | 75 | 55 | 55 | 55 | 55 | 55 |
|  | I-3 (wt %) |  |  |  |  |  |  |  |
|  | I-4 (wt %) |  |  |  |  |  |  |  |
| Graft copolymer (II) | II-1 (wt %) | 7 | 4 | 0 | 20 | 7 | 7 | 7 |
| Vinyl copolymer (III) | III-1 (wt %) | 32 | 0 | 24 | 4 | 6 | 10 | 14 |
| Crystalline resin (IV) | IV-1 (wt %) | 5 | 5 | 5 | 5 | 16 | 12 | 8 |
|  | IV-2 (wt %) |  |  |  |  |  |  |  |
| Inorganic filler (V) | V-1 (wt %) | 16 | 16 | 16 | 16 | 16 | 16 | 16 |
|  | V-2 (wt %) |  |  |  |  |  |  |  |
|  | V-3 (wt %) |  |  |  |  |  |  |  |
| Other additives | Modified polytetra-fluoroethylene (wt %) | 1 | 1 | 1 | 1 | 1 | 1 | 1 |
|  | Phosphorus-based thermal stabilizer (wt %) | 0.1 | 0.1 | 0.1 | 0.1 | 0.1 | 0.1 | 0.1 |
|  | Acidic compound (wt %) | 0.3 | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 | 0.1 |
| Content of (IV) in relation to 100 wt % of (V) |  | 31 | 31 | 31 | 31 | 100 | 75 | 50 |
| Temperature of exothermic peak | ° C. | 196 | 194 | 194 | 195 | 200 | 200 | 199 |
| Charpy impact strength | kJ/m$^2$ | 4 | 6 | 2 | 14 | 7 | 6 | 6 |
| MFR (240° C. × 98N) | g/10 min | 42 | 22 | 44 | 19 | 37 | 36 | 36 |
| Heat distortion temperature (1.82 MPa) | ° C. | 99 | 117 | 110 | 97 | 96 | 99 | 102 |
| Flexural modulus | MPa | 3970 | 4130 | 4290 | 2960 | 3710 | 3790 | 3870 |
| Coefficient of linear expansion | MD | 4.9 | 4.6 | 3.9 | 5.8 | 5.6 | 5.4 | 5.2 |
|  | TD | 6.5 | 6.3 | 5.4 | 7.2 | 7.1 | 6.9 | 6.7 |
| Appearance | 1 (poor) to 5 (good) | 5 | 2 | 4 | 4 | 3 | 4 | 4 |
| Bubbling of the coating | — | B | C | C | A | B | A | A |

|  |  | Comp. Ex. 8 | Comp. Ex. 9 | Comp. Ex. 10 | Comp. Ex. 11 | Comp. Ex. 12 |
|---|---|---|---|---|---|---|
| Polycarbonate resin (I) | I-1 (wt %) |  |  |  |  |  |
|  | I-2 (wt %) | 55 | 55 | 55 | 56 | 55 |
|  | I-3 (wt %) |  |  |  |  |  |
|  | I-4 (wt %) |  |  |  |  |  |
| Graft copolymer (II) | II-1 (wt %) | 7 | 7 | 7 | 7 | 7 |
| Vinyl copolymer (III) | III-1 (wt %) | 20.5 | 17 | 22 | 25 | 10 |
| Crystalline resin (IV) | IV-1 (wt %) | 1.5 | 1 | 0 | 3 | 7 |
|  | IV-2 (wt %) |  |  |  |  |  |
| Inorganic filler (V) | V-1 (wt %) | 16 | 20 | 16 | 9 | 21 |
|  | V-2 (wt %) |  |  |  |  |  |
|  | V-3 (wt %) |  |  |  |  |  |
| Other additives | Modified polytetra-fluoroethylene (wt %) | 1 | 1 | 1 | 1 | 1 |
|  | Phosphorus-based thermal stabilizer (wt %) | 0.1 | 0.1 | 0.1 | 0.1 | 0.1 |
|  | Acidic compound (wt %) | 0.3 | 0.3 | 0.3 | 0.3 | 0.3 |
|  | Organophosphate compound (wt %) | 0.1 | 0.1 | 0.1 | 0.1 | 0.1 |
| Content of (IV) in relation to 100 wt % of (V) |  | 9 | 5 | 0 | 33 | 33 |
| Temperature of exothermic peak | ° C. | 184 | Peak could not be detected | Peak could not be detected | 197 | 197 |
| Charpy impact strength | kJ/m$^2$ | 6 | 6 | 7 | 9 | 6 |
| MFR (240° C. × 98N) | g/10 min | 39 | 35 | 39 | 35 | 33 |
| Heat distortion temperature (1.82 MPa) | ° C. | 113 | 114 | 112 | 105 | 113 |

TABLE 3-continued

|  |  |  |  |  |  |  |
|---|---|---|---|---|---|---|
| Flexural modulus | MPa | 3940 | 4120 | 3960 | 2980 | 3980 |
| Coefficient of linear | MD | 4.8 | 4.1 | 4.7 | 6.5 | 4.7 |
| expansion | TD | 6.4 | 6.0 | 6.4 | 7.5 | 6.5 |
| Appearance | 1 (poor) to 5 (good) | 2 | 1 | 1 | 5 | 2 |
| Bubbling of the coating | — | C | C | D | B | C |

TABLE 4

|  |  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|
| Polycarbonate resin (I) | I-1 (wt %) |  |  |  |  |  |  |  |  |  |  |
|  | I-2 (wt %) | 50 | 55 | 65 | 70 | 55 | 55 | 55 | 55 | 55 | 55 |
|  | I-3 (wt %) |  |  |  |  |  |  |  |  |  |  |
|  | I-4 (wt %) |  |  |  |  |  |  |  |  |  |  |
| Graft copolymer (II) | II-1 (wt %) |  |  |  |  |  |  |  |  |  |  |
|  | II-2 (wt %) | 10 | 10 | 4 | 4 | 3 | 14 | 10 | 10 | 10 | 10 |
| Vinyl copolymer (III) | III-1 (wt %) | 19 | 14 | 10 | 10 | 21 | 10 | 11.8 | 13 | 15 | 13 |
| Crystalline resin (IV) | IV-1 (wt %) | 5 | 5 | 5 | 4 | 5 | 5 | 7.2 | 6 | 4 | 2 |
|  | IV-2 (wt %) |  |  |  |  |  |  |  |  |  |  |
| Inorganic filler (V) | V-1 (wt %) | 16 | 16 | 16 | 12 | 16 | 16 | 16 | 16 | 16 | 20 |
|  | V-2 (wt %) |  |  |  |  |  |  |  |  |  |  |
|  | V-3 (wt %) |  |  |  |  |  |  |  |  |  |  |
| Other additives | Modified polytetra-fluoroethylene (wt %) | 1 | 1 | 1 | 1 | 1 | 1 | 1 | 1 | 1 | 1 |
|  | Phosphorus-based thermal stabilizer (wt %) | 0.1 | 0.1 | 0.1 | 0.1 | 0.1 | 0.1 | 0.1 | 0.1 | 0.1 | 0.1 |
|  | Acidic compound (wt %) | 0.3 | 0.3 | 0.3 | 0.3 | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 | 0.1 | 0.1 | 0.1 | 0.1 |
| Content of (IV) in relation to 100 wt % of (V) |  | 31 | 31 | 31 | 33 | 31 | 31 | 45 | 38 | 25 | 10 |
| Temperature of exothermic peak | °C. | 196 | 196 | 196 | 196 | 196 | 196 | 198 | 197 | 194 | 187 |
| Charpy impact strength | $kJ/m^2$ | 8 | 8 | 7 | 8 | 6 | 13 | 8 | 8 | 9 | 8 |
| MFR (240° C. × 98N) | g/10 min | 38 | 35 | 32 | 32 | 43 | 32 | 38 | 38 | 39 | 35 |
| Heat distortion temperature (1.82 MPa) | °C. | 103 | 107 | 113 | 114 | 111 | 105 | 103 | 105 | 109 | 111 |
| Flexural modulus | MPa | 3860 | 3900 | 4100 | 3850 | 4150 | 3430 | 3860 | 3880 | 3880 | 4150 |
| Coefficient of linear | MD ($\times 10^{-5}$/K) | 4.8 | 4.8 | 4.7 | 5.3 | 4.6 | 5.4 | 5.1 | 5.0 | 4.9 | 4.4 |
| expansion | TD ($\times 10^{-5}$/K) | 6.8 | 6.7 | 6.7 | 7.1 | 6.6 | 7.3 | 7.0 | 7.0 | 6.9 | 6.4 |
| Appearance | 1 (poor) to 5 (good) | 5 | 5 | 5 | 5 | 5 | 5 | 5 | 5 | 4 | 3 |
| Bubbling of the coating | — | A | A | B | B | B | A | A | A | B | B |
| Weatherability | ΔE | 2.1 | 1.7 | 1.9 | 2.0 | 2.3 | 1.6 | 1.7 | 1.8 | 1.7 | 1.7 |

TABLE 5

|  |  | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|---|
| Polycarbonate resin (I) | I-1 (wt %) | 55 |  |  |  |  |  |  |  |  |  |
|  | I-2 (wt %) |  | 40 | 25 |  |  | 55 | 55 | 55 | 55 | 55 |
|  | I-3 (wt %) |  | 15 | 30 | 55 |  |  |  |  |  |  |
|  | I-4 (wt %) |  |  |  |  | 55 |  |  |  |  |  |
| Graft copolymer (II) | II-1 (wt %) |  |  |  |  |  |  |  |  |  |  |
|  | II-2 (wt %) | 10 | 10 | 10 | 10 | 10 | 10 | 10 | 10 | 10 | 10 |
| Vinyl copolymer (III) | III-1 (wt %) | 14 | 14 | 14 | 14 | 14 | 14 | 14 | 14 | 14 | 14 |
| Crystalline resin (IV) | IV-1 (wt %) | 5 | 5 | 5 | 5 | 5 |  | 5 | 5 | 5 |  |
|  | IV-2 (wt %) |  |  |  |  |  | 5 |  |  |  |  |
|  | IV-3 (wt %) |  |  |  |  |  |  |  |  |  | 5 |
| Inorganic filler (V) | V-1 (wt %) | 16 | 16 | 16 | 16 | 16 | 16 |  |  | 8 | 16 |
|  | V-2 (wt %) |  |  |  |  |  |  | 16 |  |  |  |
|  | V-3 (wt %) |  |  |  |  |  |  |  | 16 |  |  |
|  | V-4 (wt %) |  |  |  |  |  |  |  |  | 8 |  |
| Other Additives | Modified polytetra-fluoroethylene (wt %) | 1 | 1 | 1 | 1 | 1 | 1 | 1 | 1 | 1 | 1 |
|  | Phosphorus-based thermal stabilizer (wt %) | 0.1 | 0.1 | 0.1 | 0.1 | 0.1 | 0.1 | 0.1 | 0.1 | 0.1 | 0.1 |
|  | Acidic compound (wt %) | 0.3 | 0.3 | 0.3 | 0.3 | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 | 0.1 | 0.1 | 0.1 | 0.1 |
| Content of (IV) in relation to 100 wt % of (V) |  | 31 | 31 | 31 | 31 | 31 | 31 | 31 | 31 | 31 | 31 |
| Temperature of exothermic peak | °C. | 196 | 196 | 196 | 196 | 196 | 196 | 196 | 196 | 196 | 218 |

TABLE 5-continued

|  |  | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|---|
| Charpy impact strength | kJ/m² | 6 | 8 | 9 | 11 | 13 | 9 | 17 | 11 | 8 | 8 |
| MFR (240° C. × 98N) | g/10 min | 53 | 31 | 28 | 24 | 15 | 38 | 22 | 25 | 39 | 19 |
| Heat distortion temperature (1.82 MPa) | ° C. | 106 | 107 | 108 | 108 | 109 | 108 | 108 | 108 | 106 | 114 |
| Flexural modulus | MPa | 3900 | 3870 | 3810 | 3900 | 3850 | 3930 | 3550 | 3730 | 4080 | 4020 |
| Coefficient of linear expansion | MD (×10⁻⁵/K) | 4.9 | 5.0 | 4.8 | 4.8 | 4.8 | 5.1 | 5.6 | 5.7 | 4.3 | 4.7 |
|  | TD (×10⁻⁵/K) | 6.9 | 6.9 | 6.8 | 6.9 | 6.8 | 6.7 | 7.2 | 7.3 | 7.3 | 6.7 |
| Appearance | 1 (poor) to 5 (good) | 5 | 5 | 5 | 3 | 3 | 5 | 4 | 5 | 5 | 5 |
| Bubbling of the coating | — | A | A | A | A | A | A | A | A | A | A |
| Weatherability | ΔE | 1.8 | 1.7 | 1.7 | 1.8 | 1.9 | 2.0 | 1.8 | 1.8 | 1.7 | 1.8 |

TABLE 6

|  |  | Comp. Ex. 13 | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|---|
| Polycarbonate resin (I) | I-1 (wt %) |  |  |  |  |  |  |  |
|  | I-2 (wt %) | 40 | 75 | 55 | 55 | 55 | 55 | 55 |
|  | I-3 (wt %) |  |  |  |  |  |  |  |
|  | I-4 (wt %) |  |  |  |  |  |  |  |
| Graft copolymer (II) | II-1 (wt %) |  |  |  |  |  |  |  |
|  | II-2 (wt %) | 10 | 4 | 0 | 20 | 10 | 10 | 10 |
| Vinyl copolymer (III) | III-1 (wt %) | 29 | 0 | 24 | 4 | 3 | 7 | 11 |
| Crystalline resin (IV) | IV-1 (wt %) | 5 | 5 | 5 | 5 | 16 | 12 | 8 |
|  | IV-2 (wt %) |  |  |  |  |  |  |  |
| Inorganic filler (V) | V-1 (wt %) | 16 | 16 | 16 | 16 | 16 | 16 | 16 |
|  | V-2 (wt %) |  |  |  |  |  |  |  |
|  | V-3 (wt %) |  |  |  |  |  |  |  |
| Other additives | Modified polytetra-fluoroethylene (wt %) | 1 | 1 | 1 | 1 | 1 | 1 | 1 |
|  | Phosphorus-based thermal stabilizer (wt %) | 0.1 | 0.1 | 0.1 | 0.1 | 0.1 | 0.1 | 0.1 |
|  | Acidic compound (wt %) | 0.3 | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 | 0.1 |
| Content of (IV) in relation to 100 wt % of (V) |  | 31 | 31 | 31 | 31 | 100 | 75 | 50 |
| Temperature of exothermic peak | ° C. | 195 | 195 | 194 | 195 | 200 | 199 | 199 |
| Charpy impact strength | kJ/m² | 5 | 5 | 2 | 13 | 9 | 8 | 8 |
| MFR (240° C. × 98N) | g/10 min | 43 | 23 | 44 | 20 | 38 | 37 | 37 |
| Heat distortion temperature (1.82 MPa) | ° C. | 98 | 116 | 110 | 96 | 95 | 98 | 101 |
| Flexural modulus | MPa | 3950 | 4120 | 4290 | 2930 | 3680 | 3760 | 3850 |
| Coefficient of linear expansion | MD (×10⁻⁵/K) | 5.2 | 4.7 | 3.9 | 6.1 | 5.8 | 5.6 | 5.4 |
|  | TD (×10⁻⁵/K) | 6.8 | 6.5 | 5.4 | 7.5 | 7.4 | 7.0 | 6.9 |
| Appearance | 1 (poor) to 5 (good) | 5 | 2 | 4 | 4 | 3 | 4 | 4 |
| Bubbling of the coating | — | B | C | C | A | B | A | A |
| Weatherability | ΔE | 2.7 | 1.9 | 2.8 | 1.6 | 1.4 | 1.5 | 1.7 |

|  |  | Comp. Ex. 20 | Comp. Ex. 21 | Comp. Ex. 22 | Comp. Ex. 23 | Comp. Ex. 24 | Ex. 41 |
|---|---|---|---|---|---|---|---|
| Polycarbonate resin (I) | I-1 (wt %) |  |  |  |  |  |  |
|  | I-2 (wt %) | 55 | 55 | 55 | 55 | 55 | 55 |
|  | I-3 (wt %) |  |  |  |  |  |  |
|  | I-4 (wt %) |  |  |  |  |  |  |
| Graft copolymer (II) | II-1 (wt %) |  |  |  |  |  | 10 |
|  | II-2 (wt %) | 10 | 10 | 10 | 10 | 10 |  |
| Vinyl copolymer (III) | III-1 (wt %) | 17.5 | 14 | 19 | 23 | 7 | 14 |
| Crystalline resin (IV) | IV-1 (wt %) | 1.5 | 1 | 0 | 3 | 7 | 5 |
|  | IV-2 (wt %) |  |  |  |  |  |  |
| Inorganic filler (V) | V-1 (wt %) | 16 | 20 | 16 | 9 | 21 | 16 |
|  | V-2 (wt %) |  |  |  |  |  |  |
|  | V-3 (wt %) |  |  |  |  |  |  |
| Other additives | Modified polytetra-fluoroethylene (wt %) | 1 | 1 | 1 | 1 | 1 | 1 |
|  | Phosphorus-based thermal stabilizer (wt %) | 0.1 | 0.1 | 0.1 | 0.1 | 0.1 | 0.1 |
|  | Acidic compound (wt %) | 0.3 | 0.3 | 0.3 | 0.3 | 0.3 | 0.3 |
|  | Organophosphate compound (wt %) | 0.1 | 0.1 | 0.1 | 0.1 | 0.1 | 0.1 |

TABLE 6-continued

| | | | | | | | |
|---|---|---|---|---|---|---|---|
| Content of (IV) in relation to 100 wt % of (V) | | 9 | 5 | 0 | 33 | 33 | 31 |
| Temperature of exothermic peak | °C. | 184 | Peak could not be detected | Peak could not be detected | 196 | 196 | 196 |
| Charpy impact strength | kJ/m² | 8 | 8 | 9 | 11 | 8 | 7 |
| MFR (240° C. × 98N) | g/10 min | 40 | 36 | 40 | 36 | 34 | 35 |
| Heat distortion temperature (1.82 MPa) | °C. | 112 | 113 | 111 | 104 | 112 | 107 |
| Flexural modulus | MPa | 3910 | 4090 | 3930 | 2950 | 4170 | 3880 |
| Coefficient of linear expansion | MD (×10⁻⁵/K) | 5.0 | 4.3 | 4.9 | 6.5 | 4.4 | 4.9 |
| | TD (×10⁻⁵/K) | 6.6 | 6.4 | 6.6 | 7.8 | 6.5 | 6.6 |
| Appearance | 1 (poor) to 5 (good) | 2 | 1 | 1 | 5 | 2 | 5 |
| Bubbling of the coating | — | C | C | D | B | C | A |
| Weatherability | ΔE | 2.0 | 2.1 | 2.2 | 2.5 | 1.6 | 8.7 |

INDUSTRIAL APPLICABILITY

The present invention relates to a thermoplastic resin composition exhibiting good balance of mechanical properties, heat resistance, flowability, and size stability as well as excellent stability in retention in the molding, appearance of the molded article, and coating properties. This composition is well adapted for use in the fields of automobiles, and more specifically, for automotive exterior parts such as rear spoiler, wheel cap, door mirror, and radiator grill and for automobile interior parts such as power window panel, center console, center cluster, lever controller, and console box, and automobile exterior parts such as rear spoiler, grill, garnish, door mirror, roof, fender, and bumper. This composition is also well adapted for use in the fields other than automobiles such as OA appliance and home appliance, building materials, suit cases, and bags.

EXPLANATION OF NUMERALS

P: rectangular plate

The invention claimed is:

1. A thermoplastic resin composition prepared by blending
   a polycarbonate resin (I), a graft copolymer (II), a vinyl copolymer (III) prepared by copolymerizing at least an aromatic vinyl monomer and a vinyl cyanide monomer, a crystalline resin (IV), and a plate-shaped inorganic filler (V); wherein the graft copolymer (II) is
   a graft copolymer (II-1) prepared by graft polymerization of a monomer mixture containing at least an aromatic vinyl monomer and a vinyl cyanide monomer in the presence of a diene rubbery polymer, or
   a graft copolymer (II-2) prepared by graft polymerization of a monomer mixture containing an aromatic vinyl monomer and a vinyl cyanide monomer in the presence of an acryl rubbery polymer prepared by copolymerizing an acrylate monomer and a polyfunctional monomer, and
   content of the polycarbonate resin (I) is 50 to 70% by weight, the graft copolymer (II) is 3 to 15% by weight, the vinyl copolymer (III) is 10 to 25% by weight, the crystalline resin (IV) is 1 to 9% by weight, and the inorganic filler (V) is 10 to 20% by weight in relation to 100% by weight of total content of the polycarbonate resin (I), the graft copolymer (II), the vinyl copolymer (III), the crystalline resin (IV), and the inorganic filler (V), and content of the crystalline resin (IV) in relation to 100% by weight of the inorganic filler (V) is at least 10% by weight and less than 50% by weight.

2. A thermoplastic resin composition according to claim 1 wherein the crystalline resin (IV) is polybutylene terephthalate resin.

3. A thermoplastic resin composition according to claim 1 or 2 wherein the plate-shaped inorganic filler (V) is talc.

4. A thermoplastic resin composition according to claim 1 wherein content of the crystalline resin (IV) in relation to 100% by weight of the plate-shaped inorganic filler (V) is at least 20% by weight and up to 40% by weight.

5. A thermoplastic resin composition according to claim 1 wherein the polycarbonate resin (I) has a viscosity average molecular weight of at least 10,000 and up to 21,000.

6. A thermoplastic resin composition according to claim 1 wherein temperature of exothermic peak corresponding to crystallization of the crystalline resin (IV) expressed in the temperature descending stage in differential scanning calorimetry is at least 185° C.

7. An article prepared by molding the thermoplastic resin composition according to claim 1.

* * * * *